United States Patent
Alfredson

(10) Patent No.: US 7,654,934 B2
(45) Date of Patent: Feb. 2, 2010

(54) LOCKING DIFFERENTIAL

(76) Inventor: Jonas Lars Alfredson, Bråta Ängsväg 6, Lerum (SE) SE-44351

( * ) Notice: Subject to any disclaimer, the term of this patent is extended or adjusted under 35 U.S.C. 154(b) by 440 days.

(21) Appl. No.: 11/577,012

(22) PCT Filed: Oct. 7, 2005

(86) PCT No.: PCT/SE2005/001483

§ 371 (c)(1), (2), (4) Date: Apr. 11, 2007

(87) PCT Pub. No.: WO2006/041384

PCT Pub. Date: Apr. 20, 2006

(65) Prior Publication Data

US 2009/0062055 A1  Mar. 5, 2009

(30) Foreign Application Priority Data

Oct. 11, 2004  (SE) .................... 0402448

(51) Int. Cl.
*B60W 10/12* (2006.01)
(52) U.S. Cl. .................. 477/35; 475/231
(58) Field of Classification Search .......... 475/231, 475/249; 477/35
See application file for complete search history.

(56) References Cited

U.S. PATENT DOCUMENTS

| | | | |
|---|---|---|---|
| 5,286,239 A | 2/1994 | Ito et al. | |
| 5,924,510 A | 7/1999 | Itoh et al. | |
| 6,017,287 A | 1/2000 | Deese | |
| 7,147,584 B1* | 12/2006 | Lu | 475/250 |
| 7,264,569 B2* | 9/2007 | Fox | 475/241 |
| 7,357,749 B2* | 4/2008 | Nofzinger et al. | 475/231 |
| 7,361,116 B2* | 4/2008 | Kyle et al. | 475/232 |

FOREIGN PATENT DOCUMENTS

| EP | 0939247 | 9/1999 |
|---|---|---|
| JP | 06328964 A * | 11/1994 |

* cited by examiner

*Primary Examiner*—Ha D. Ho
(74) *Attorney, Agent, or Firm*—Albihns AB

(57) ABSTRACT

A differential gear is equipped with a selectively controllable locking device which is self energizing, i.e. it utilizes the differentiation energy to self-lock on its own accord. The control signal is therefore not needed to lock the locking device but rather to selectively, separately for each of the two possible differentiation directions, control it to not lock itself. This gives the differential gear four different working modes. These are: open regardless of differentiation direction; open in one differentiation direction but self-locking in the other direction; open in the other direction but self-locking in the first one; self locking regardless of differentiation direction. A control unit is supplied with sensor data of the present "driving situation". The control unit has a steering strategy. With the right steering strategy it can regulate the control signal so as to permit the differential gear to equalize the torque at each output shaft for as long as possible but still to practically eliminate the risk of one wheel spin.

8 Claims, 10 Drawing Sheets

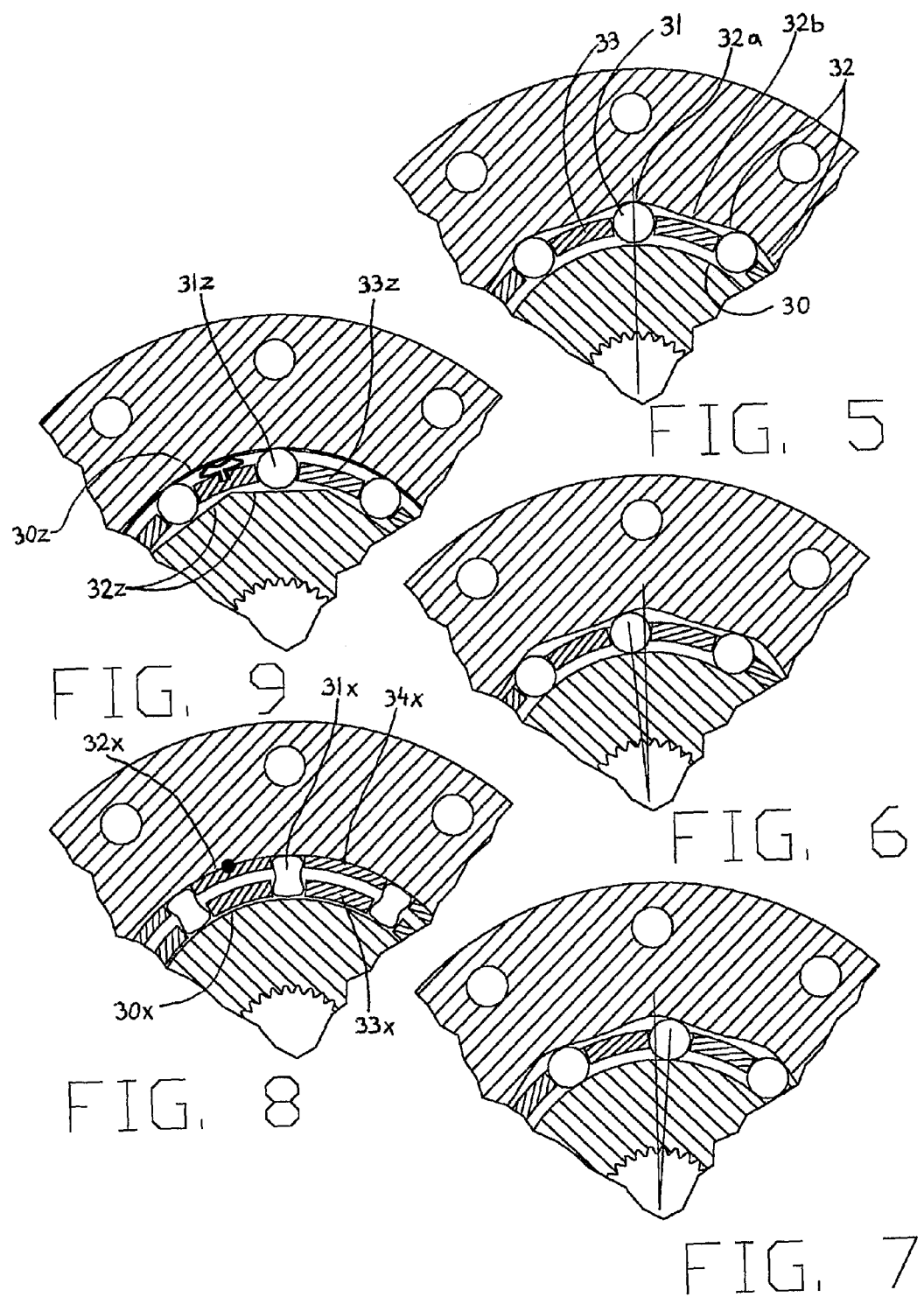

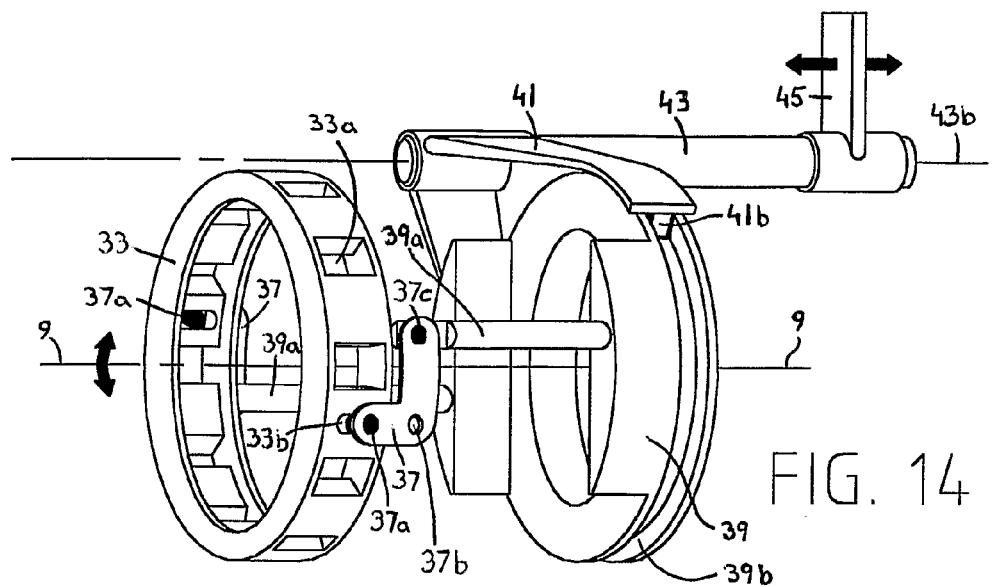
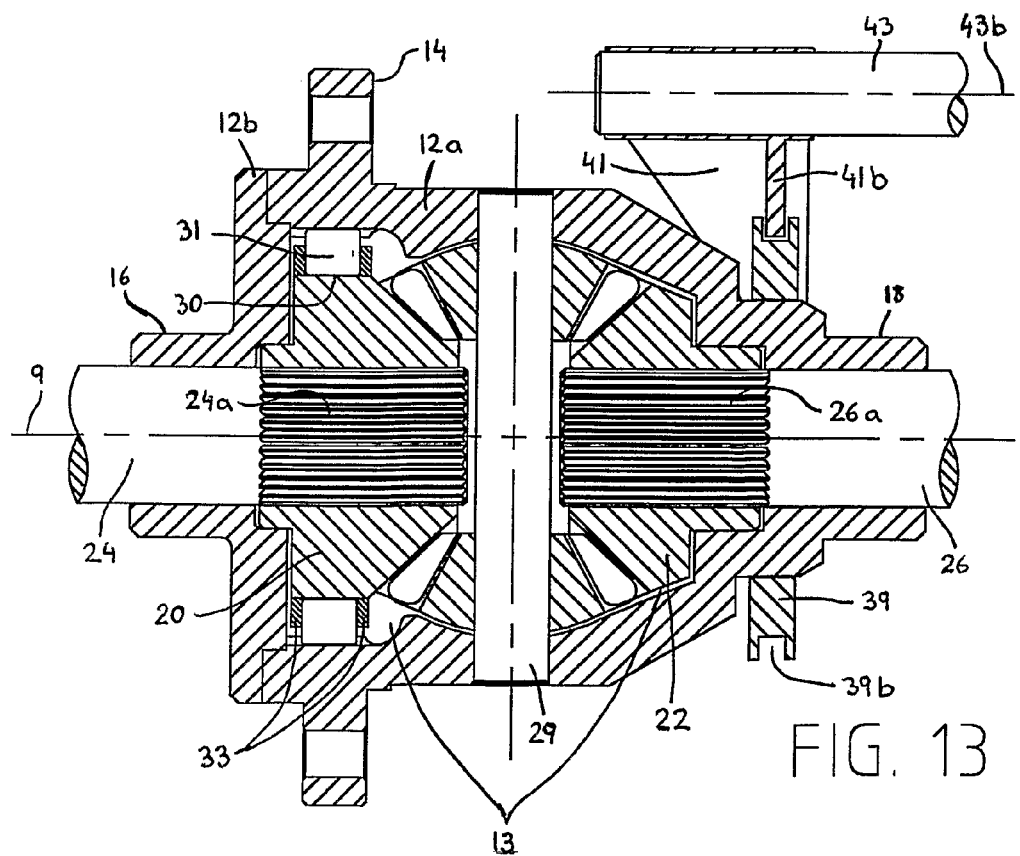

LOCKING DIFFERENTIAL

CROSS REFERENCE TO RELATED APPLICATIONS

This application is a national stage application of International Application PCT/SE2005/001483, filed 7 Oct. 2005, designating the United States of America, which claims the benefit of 0402448-5 filed 11 Oct. 2004.

FIELD OF THE INVENTION

The present invention relates to an apparatus for the distribution of the traction forces between the road wheels on each side of a motor vehicle (e.g. a car).

DESCRIPTION OF THE RELATED ART

The most common way to deal with this task is through the use of a conventional differential gear, or as it is more commonly known, an "open differential". The open differential has been known for a long time, and it normally consists of some kind of planetary gear with one input shaft and two output shafts. The detailed layout can take one of several different forms but (by far) the most common form is the bevelled gear variant, in which both of the output shafts consists of bevelled gearwheels (sun wheels) and the planetary wheels, which in this case also consists of bevelled gearwheels, have their axle orientation offset 90 degrees as compared to the output shafts. The input shaft consists of the rotating differential cage which is concentrically arranged as compared to the aforementioned output shafts. The open differential is used in both two and four wheel drive vehicles to divide the engines tractive effort equally between each side of the vehicle. This is managed even when the vehicle is cornering and the wheels on each side of the vehicle are covering distances of differing length. This is achieved by the fact that the torque of the input shaft through the planetary gear is equally divided between the output shafts. During differentiation the two output shafts rotate in different directions as compared to the input shaft. To be able to achieve a torque in the various shafts of the differential, and hence a tractive effort on the vehicle there must, except from engine power, also exist a resistance at the other end, i.e. at the contact patches of the tyres to the ground. The open differential has one functional problem. This problem occurs if one of the driving wheels does not have enough traction to handle its half of the torque. Then that wheel will spin up and the low internal friction (high efficiency) of the open differential will result in no more torque to the other wheel than the amount needed to spin the first wheel. This problem is the reason that has brought about the development of all the various differential brake systems of today. All of these have their more or less lowered efficiency in common and their performance characteristics lie somewhere between the open differential and the fully locked. (This does not apply to systems for "active yaw control", i.e. devices intended to admit more than half of the torque to be conveyed to the one of two output shafts with the highest rotational speed.)

The open differential could be regarded as one extreme; the other extreme would then be the fully locked differential (or the spool). With the spool the two individual wheels of one axle are forced to rotate with the exact same rotational speed at all times regardless of if the vehicle is cornering or not. These both extremes could be described in the following way. To start with the open differential, it is characterized by;

1. the rotational speed of the input shaft, is divided in an arbitrary way between the two output shafts, provided that the mean rotational speed of the output shafts equals the speed of the input shaft, which could also be described as $W_{in}=(W_{out,1}+W_{out,2})/2$ and;
2. the torque distribution in an ideal loss free differential is managed in a way that, the torque at each output shaft is always equal, wherein both are half of the torque at the input shaft, which could also be described as $M_{out,1}=M_{out,2}=M_{in}/2$.

The spool on the other hand is characterized by;
1. the rotational speed of all three shafts are equal, or $W_{in}=W_{out,1}=W_{out,2}$ and;
2. the torque distribution is arbitrary, depending on the individual resistance of each output shaft, provided that the combined torque of the output shafts equals the torque of the input shaft, or $M_{in}=M_{out,1}+M_{out,2}$.

Both of these extremes as well as all differential brakes (or limited slip differentials) react to differences in the resistance of each output shaft. What's really interesting is how they react. From the above description it can be seen that the open differential reacts to the difference of torque in each output shaft by letting each output shaft rotate in an arbitrary fashion to the extent that the resistances will be virtually equalized. In reality they will not be totally equalized during differentiation since the action of the differential can not be made 100% efficient. The efficiency can however be made infinitely low which actually is the case with the spool. From the above description it can be seen that regardless of how big the difference between the resistances of the individual output shafts get, their individual rotational speeds will never differ. This means that the torque, which is the same as the resistance, is allowed to differentiate infinitely within the limits set by the tyre friction. This fundamental difference between the described extremes depends ultimately on the differences between their efficiencies if viewed upon as gear sets. As has already been mentioned all kinds of limited slip differentials performance wise lie somewhere between these both extremes and depending on their efficiency they will under different situations act more or less like the one or the other of those.

If we imagine a completely free rolling axle of a vehicle, its both wheels will rotate at the exact same rotational speed for as long as the vehicle travels straight ahead. When the same vehicle travels through a curve the wheels of that same axle will have differentiated rotational speeds according to the radius of the curve and the track width of the axle. This differentiation can be regarded as the theoretical differentiation, but to be able to convert a torque into a tractive effort we only have the contact between the tyres and the road surface at hand. When a twisting force is applied to the wheels there is always a degree of slip in the contact between the tyres and the road surface. This slip rate increases when the twisting force increases whereas it decreases when the coefficient of friction or the normal force of the wheel increases. This slip rate can be defined as the difference, expressed as a percentage, between the circumference of the tyre and true covered road distance. At, in relation to the potential traction, low torque there will be a low slip rate. If and when the traction limit approaches, this slip rate will be considerable. There is also always an upper limit above which an increased slip rate will result in a decreased tractive effort. Depending on the design of the tyre this percentage limit can vary somewhat but it typically lies in the region of 20 percent slip. Although the maximum tractive effort that can be achieved will vary very much depending on the prevailing circumstances (e.g. the road condition), the percentage limit at which it occurs stays remarkably stable. It should also be noted that the mentioned 20 percent slip traction-peak is for traction forces acting alone. When significant lateral and longitudinal tyre forces are simultaneously present, (i.e. slip angle and slip rate at the same time) the mentioned traction-peak will occur at still much higher slip rates. However, the maximum tractive effort that can be achieved, of course decreases depending on how much of the total friction force of the tyre is "used up" by the lateral acceleration (referring to the traction circle/ellipse).

With the open differential, the slip rate of each tyre is allowed to fluctuate in an arbitrary way depending on their traction, and the torque will always (both in curves and straight ahead) be practically equal. In short one could also say that the open differential balances the tractive effort between the output shafts and ultimately between their respective drive wheel and tyre. For as long as both tyres stay beneath the aforementioned traction-limit the open differential is on principle the optimum solution (within the scope of the open-locked differential).

With the spool on the other hand, the distribution of the slip rates of the individual drive wheels are geometrically decided, i.e. as long as a vehicle travels straight ahead the slip rates of both drive wheels are always the same, whereas the difference them between in a cornering situation is decided by the radius of the corner and the track width of the driven axle. This doesn't mean that the torque always is equally divided when driving straight ahead. Since the normal force of the tyres as well as the coefficient of friction of the road surface can vary between the individual wheels, even the distribution of torque will vary. This fact means, in contrast to the open differential, that the combined traction of the both wheels on one axle always can be utilized to accelerate, i.e. if the traction of one drive wheel decreases, the other wheel will automatically carry a greater proportion of the total torque (and also, the slip-rate of the tyre with the least traction will stay close to its optimum value providing for an optimum contribution from that wheel to the total tractive effort.) During acceleration in a cornering manoeuvre on the other hand, the spool will force the inside wheel to generate a higher slip rate than the outside wheel, which as long as the traction of the inside wheel is high enough also will result in a greater proportion of the total torque. This fact often leads to a considerable yaw resisting moment (promoting under steer). Even if the drive wheels during cornering are not assigned any torque from the engine the inside wheel will generate a tractive torque, this torque is derived from the outside wheel which is simultaneously generating a braking torque. In this case the slip rates of both wheels are equal in rate but opposite in direction. (Referring to the last one of the equations above, the input torque is zero and the torque of one output shaft is positive whereas the other is negative.) In tight corners with good traction this yaw resisting moment can get extremely high and the resulting strain of the drive shafts etc. will of course be equally high.

There has also for a long time existed automatically self locking "differentials" which leads to the same ability to accelerate (or find traction) as with the spool, but without the just mentioned ability of the spool to give the output shafts a torque in each direction. Examples of such devices are the "Detroit Locker" the "No Spin" the "weissman Locker" etc. None of these devices do comprise an actual differential gear, what they really are is a kind of double freewheel couplings, arranged in a way that they in spite of the ability of each output shaft to transfer torque in both directions, the output shafts can never transfer torque in different directions simultaneously. In practice this means that they, during cornering with moderate torque from the engine, most often only drive the inside wheel whereas the outside wheel freewheels at a slightly higher rotational speed. As soon as both shafts get loaded in the same direction they will act exactly like a spool.

The basic function of the open differential is utilized only during cornering. In spite of this fact it is most often during cornering that its shortcomings exhibits itself. The reason for this stems from the lateral load transfer that always occurs during cornering and its result is inside wheel spin. Said load transfer contributes to the increase of the normal forces acting on the outside wheels and the corresponding decrease on the inside wheels. To some extent this situation is exaggerated by the fact that the wheel angles of the outside wheels, on most modern vehicles with independent suspension, are optimized for general handling reasons. All of this means that the slip rates of the drive wheels during cornering almost without exception, even with the open differential, gets higher at the inside drive wheel. This is true especially at high torque or reduced road friction. One could say that, when the slip rates of both drive wheels increase, then the slip rate of the inside wheel increases more than that of the outside wheel. The open differential is, as has already been stated, a torque balancer. (Low ground pressure+high slip rate=torque=high ground pressure+low slip rate.) The fact is that the reduced ground pressure (normal force) at the inside wheel must be compensated by a higher slip rate to achieve the same torque as the heavier loaded outside wheel. This means that some of the theoretical differentiation gets "eaten up" by the relatively higher slip rate of the inside wheel. This tendency is what eventually leads to the shortcomings of the open differential during cornering, however the risk of inside wheel spin will not be impending until after the differentiation has changed direction (as the traction-peak of the inside wheel will not occur until after that). At some point during a change of differentiation direction the torque distribution will be exactly equal. (It is the possible imbalance between the two output shafts that gives the differential the energy to differentiate in the first place.) This momentary phase, when the differential in spite of the curve radius isn't differentiating on account of the perfect balance between the resistances felt at each output shaft, can be regarded as a "crossover point" (Exactly at this crossover point it will not matter to the behaviour of the vehicle, whether it's equipped with an open differential or a spool or for that matter any kind of limited slip differential, since all kinds of differentials will be motionless on account of the balance of resistances.)

Said crossover point can be defined in the following way: The resistance at each output shaft is exactly equal. Said crossover point can thus only occur when there is no differentiation taking place, or to put it differently, said crossover point can only occur when the difference between the slip rates of each drive wheel is as big as the aforementioned theoretical differentiation. This in turn means that, the tighter the radius of the curve, the greater the difference between the slip rates of the drive wheels at which the crossover point occurs. It also means that the crossover point theoretically occurs at an infinitely small difference between the slip rates of the drive wheels when driving exactly straight ahead (or through a "curve" with an infinitely large radius if you like). One could also as a simplification say that the crossover point occurs in cornering situations, if and when the theoretical differentiation gets totally "eaten up" by the difference of the slip rates of the drive wheels.

This theoretical reasoning and the therein described crossover point forms the background of the present invention and is as such very important for the complete understanding of its function.

Previously used methods to suppress one wheel spin are, as has already been mentioned, most often based on the principle of a consciously decreased efficiency of the differential gear, to enable a greater torque to be biased to one or the other drive wheel. It is often said that these differentials always assigns more torque to the drive wheel with the best traction. Such a statement is however not always the truth, i.e. as long as the vehicle is driving straight ahead it is correct. Even during cornering, if and when the vehicle finds itself above the aforementioned crossover point, it is correct. All of this is however also correct (to an even greater extent) with a spool. On the other hand, as long as the vehicle during cornering finds itself below said crossover point, the inside drive wheel will be assigned more than half of the torque. The reason for this is the greater resistance of the inside drive wheel, derived from its shorter path through the curve combined with the deteriorated ability to differentiate. So the real truth is that a decreased efficiency of a differential, will always lead to the assignment of more than half of the torque to the drive wheel with the greatest resistance, no matter the reason for this greater resistance. In practise this all means that when driving through a curve, more than half of the torque will go to the inside drive wheel as long as it rotates slower than the outside ditto. If the limited slip differential in spite of the curve doesn't differentiate one can of course no longer determine the torque distribution between the individual output shafts by comparing their respective rotational speeds, but as long as the inside drive wheel has an ability to transform more than half of the torque into a tractive effort, one can be sure that it will do just that since it at this point has a greater slip rate than the outside drive wheel. Only if and when the vehicle really has passed the crossover point, the outside drive wheel will deliver more than half of the tractive effort since the inside wheel simply has lost its ability to make an equally strong resistance as the heavier loaded outside wheel. The last statement is of course valid even if the differentiation in spite of the limited slip differential starts differentiating in the "wrong" direction. All of this together shows us that in all the cases when the ability of the inside drive wheel to transform the torque into a tractive effort hasn't been exceeded, that wheel will give a greater tractive effort than the outside wheel. This will lead to a "drive related" under steering moment about the yaw-axis of the vehicle. This fact together with the fact that even a limited slip differential can differentiate in the "wrong" direction, is the reason for the inevitable compromise inherent in the limited slip differential, i.e. the compromise between the ability to differentiate in an appropriate way during cornering and at the same time the ability to suppress "one wheel spin". Thus, the optimum solution (within the scope of the open-locked differential) is a fully open differential below the described "crossover point" and a fully locked differential above it, as the differentiation at that point no longer serves a purpose.

There are many different kinds of limited slip differentials around today, all of those have as has already been mentioned one thing in common, namely their consciously lowered efficiency which give the desired ability to bias a greater part of the torque to one or the other of the drive wheels. In the more advanced limited slip differentials the efficiency is variable in some way or the other. This variable efficiency is aimed to better meet the contradictory demands put on the differential, i.e. to allow "normal" differentiation but not "one wheel spin". There are many different ways to achieve this and the most important principle differences between the ways to achieve this is that in some variants the efficiency is dependent of the relative speed of the output shafts whereas in others it's mainly dependent of the transmitted torque, i.e. the efficiency drops in relation to an increase of the transmitted torque.

The first of said two principles utilizes the fact that the relative speed difference during cornering usually is pretty low, whereas the speed difference of a one wheel spin can get much higher. The disadvantage of limited slip differentials using this principle is however that although they can be "severe" to different degrees, they will always allow some amount of one wheel spin. Another disadvantage is that the torque biasing ability isn't as "direct" as it is in the "torque sensing" variants.

The "torque sensing" differentials utilize the transmitted torque to lower the efficiency. The reasoning behind this principle is to suppress the differentiation harder the higher the torque is, as the risk that one of the drive wheels will slip gets higher along with the increased torque. The biggest disadvantage with this principle makes itself evident if one of the drive wheels has considerably less traction than the other one. If this is the case there is a risk that not enough torque can be applied to help lower the efficiency enough to avoid unwanted differentiation (i.e. one wheel spin). One way to avoid this problem is to use some kind of "preload" in the design, to avoid "too high" an efficiency at low torque transmission. This is however just another compromise that has to be considered.

For some of the limited slip differentials the lowered efficiency is due to the actual design of the gearing (e.g. the TORSEN differential). For others it is the result of the combination of a conventional differential gear and a friction generating device (e.g. plate diffs and viscous diffs). For the latter category there is an option to make the efficiency controllable from the outside, through some kind of "signal" which can be controlled through electronic logic to make the differential work in a more optimum way at every conceivable condition. There are also variants of locking differentials in the form of a conventional differential gear combined with some kind of fully locking devise in a similar way as the present invention. A few examples of that are the following patents assigned to the adjoining companies, Eaton Corporation U.S. Pat. No. 6,551,209 (B2), NTN Corporation U.S. Pat. No. 6,702,708 (B2). Another example is a torque sensing differential gear combined with a fully locking device, Tractech Inc. U.S. Pat. No. 6,309,321 (B1). The difference between these examples and the present invention lies primarily in the control of the function of the locking device and in the resulting general behaviour of the present invention.

The above mentioned compromise lies, as has already been stated, in the strive for an ability to assign more than half of the tractive effort to the wheel with the best traction. However, preferably without unnecessarily strong yaw resisting moments during cornering, for as long as the "inside" drive wheel has enough traction to take care of its half of the torque, i.e. under all of the circumstances when a differential brake is not needed at all.

SUMMARY OF THE INVENTION

The purpose of the present invention is to distribute the torque of the engine, on a "driving dynamics" perspective, as optimum as possible with regard to the ability of the individual tyres to transform the torque into a tractive effort as well as to the influence of said tractive effort on the "yaw attitude" of the vehicle (i.e. yaw resisting/assisting moments). A further purpose is to achieve the aforementioned without undue mechanical complexity and the accompanying high cost and lastly with the highest possible efficiency, ie without unnecessarily high internal losses and hence with the lowest possible wear and energy consumption and lastly without conflicting with ABS and ESP (Electronic Stability Program). The above mentioned purpose is achieved according to the present invention through an apparatus comprising a differential gear and a self energizing locking device arranged between two of said differential gears three shafts, characterised by the fact that the function of said locking device, through a control signal, is controllable between four distinct working modes, said working modes can be described by the fact that;

said locking device is not prevented from functioning during differentiation in any of the two differentiation directions so that any differentiation will be automatically locked regardless of differentiation direction;

said locking device is prevented from functioning during differentiation in the first differentiation direction so that any differentiation in said first direction will not be locked;

said locking device is prevented from functioning in (in relation to said first direction) the opposite direction so that any differentiation in said opposite direction will not be locked;

said locking device is prevented from functioning during differentiation in any of the two differentiation directions so that no differentiation will be locked regardless of differentiation direction.

A differential gear that reacts to the described "crossover point" in the way that it is fully open "below" it and fully locked "above" it, totally eliminates the biggest problem of the conventional differential, namely "inside wheel spin". It also does just that without any drawbacks in the form of yaw resisting moments during cornering. Instead it gives a virtually balanced drive for as long as both drive wheels are capable of transforming their torque into a tractive effort. Only if and when the "inside" drive wheel approaches its tractive limit, the differential will lock and the greater part of the torque will be directed to where the greatest resistance is, i.e. to the heavier loaded "outside" drive wheel, which of course to some degree will lead to a yaw assisting moment, but which will also lead to the optimization of the slip rate of the inside drive wheel. Even when driving straight ahead a differential gear reacting in this way will solve the problems of the conventional differential as it instantly will lock any beginning differentiation.

BRIEF DESCRIPTION OF THE DRAWINGS

The present invention and its function will be better understood when viewed upon in the light of the accompanying drawings, in which:

FIG. 5 is a partial cross-section of the locking device in the open position;

FIG. 6 is a partial cross-section of the locking device locked in one direction;

FIG. 7 is a partial cross-section of the locking device locked in the opposite direction;

FIG. 8 is an alternative locking device (35) in the open position;

FIG. 9 is another alternative locking device (35) in the open position;

FIG. 13 is across-section of the present invention, including parts of the mechanical signal system according to the second embodiment;

FIG. 14 is a perspective view of the roller cage and parts of the mechanical signal system according to the second embodiment;

FIG. 22 represents the preferred embodiment, i.e. with the locking device between the input shaft and one of the output shafts;

FIG. 23 represents an embodiment with the locking device placed directly between the two output shafts;

FIG. 24 represents an embodiment with two locking devices, where both are locking synchronously;

FIG. 25 represents an embodiment with two locking devices, where only one locks at a time;

DETAILED DESCRIPTION OF THE PREFERRED EMBODIMENTS

Figure 2:
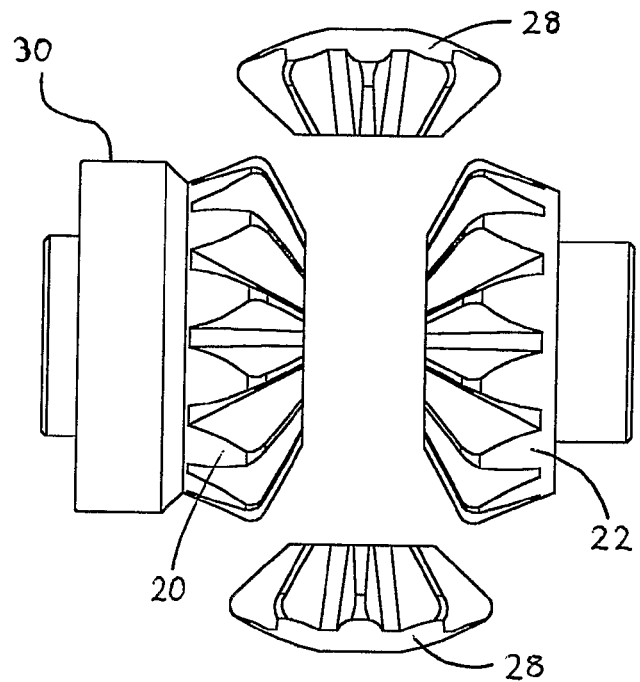
FIG. 2 is a view of the side wheels (sun wheels) and planetary wheels including the, to one off the side wheels integrated, roller race, said side wheels and planetary wheels together with the details shown in FIG. 1 form the differential gear itself, generally designated (25)
Figure 1:
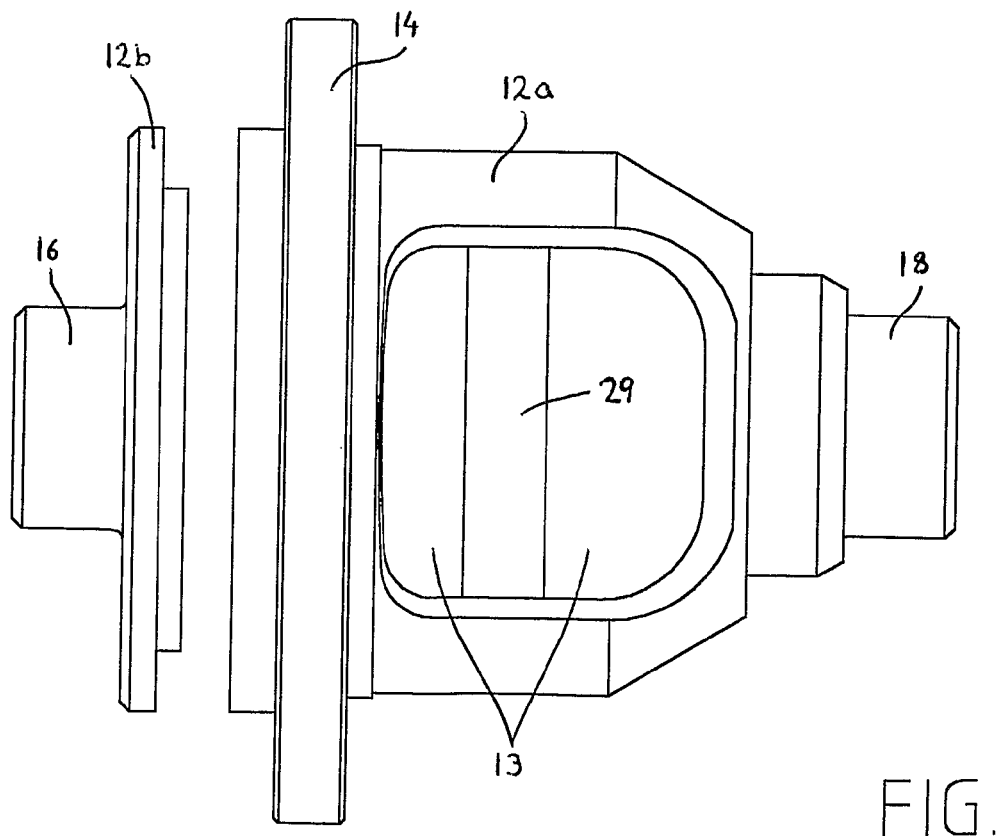
FIG. 1 is a view of the differential cage, comprising its main part (12a) and its end-cover (12b), together with the pinion shaft.
Figure 4:
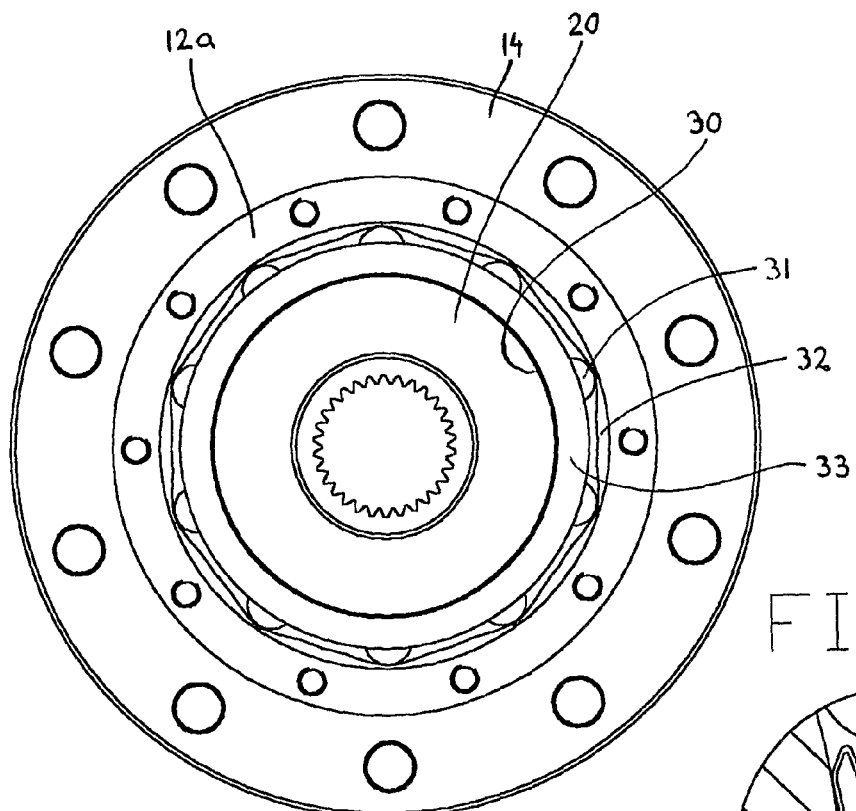
FIG. 4 is a view of the present differential gear including its locking device viewed in an axial direction with the end-cover (12b) removed.
Figure 3:
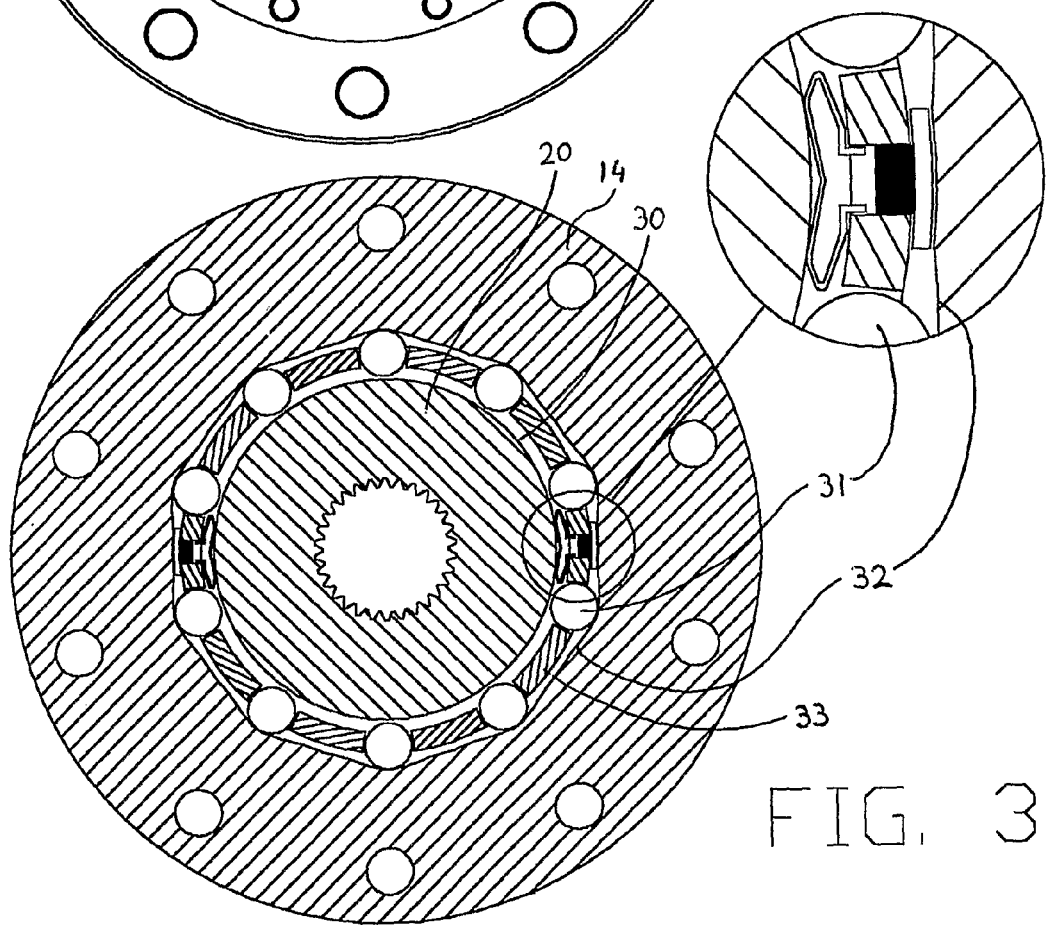
FIG. 3 is an axial cross-section of the differential cage (at its widest section), the present cross-section also shows the cam profile, roller race, the cylindrical rollers, the roller cage and two resilient elements to cause a friction between the roller race and the roller cage, these parts together form the locking device itself, generally designated (35)
Figure 12:
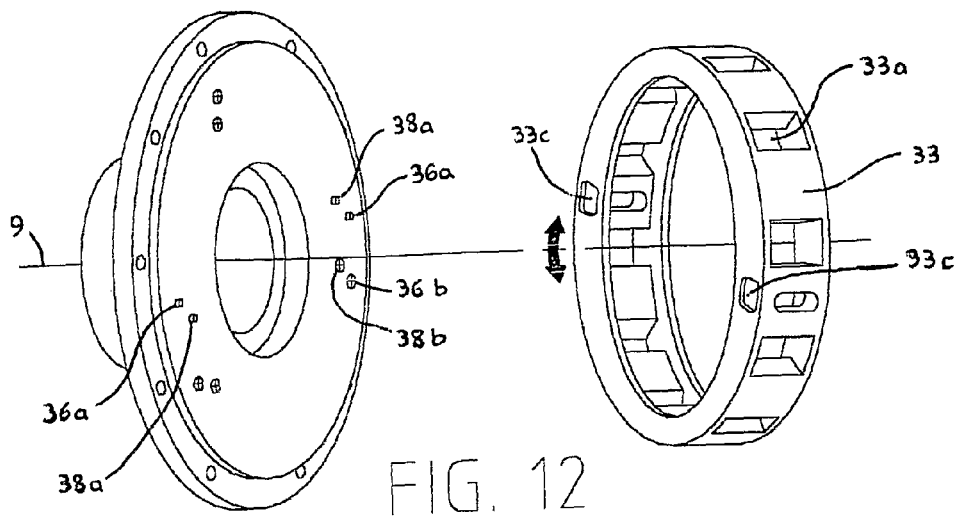
FIG. 12 is a perspective view of the roller cage and the end-cover (12b) according to the first embodiment.
Figure 10:
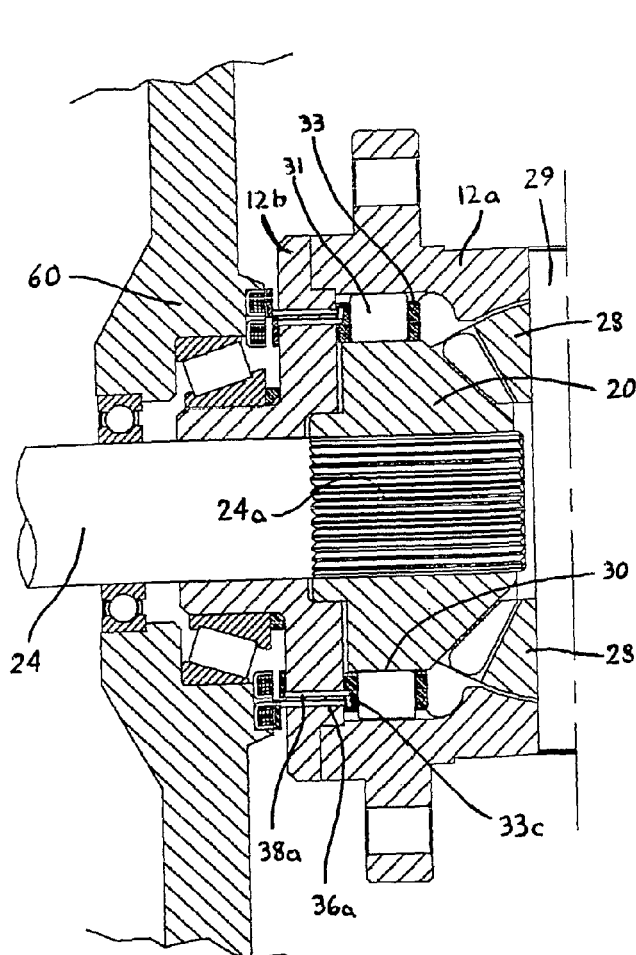
FIG. 10 is a partial cross-section of the present invention according to the first embodiment.
Figure 11:
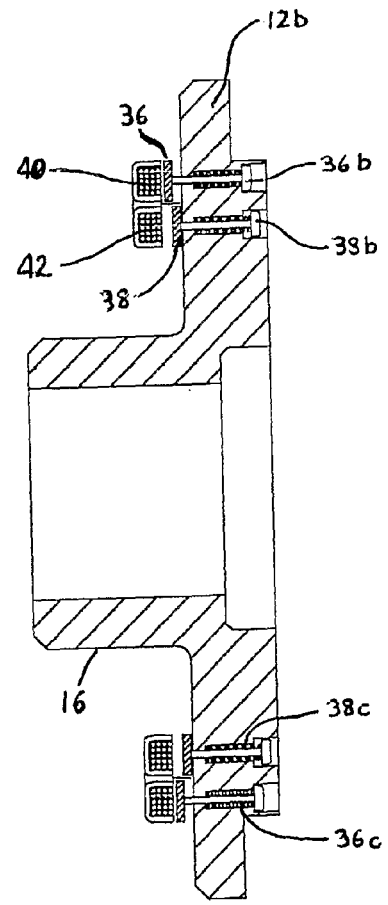
FIG. 11 is another partial cross-section of the present invention according to the first embodiment.
Figure 16:
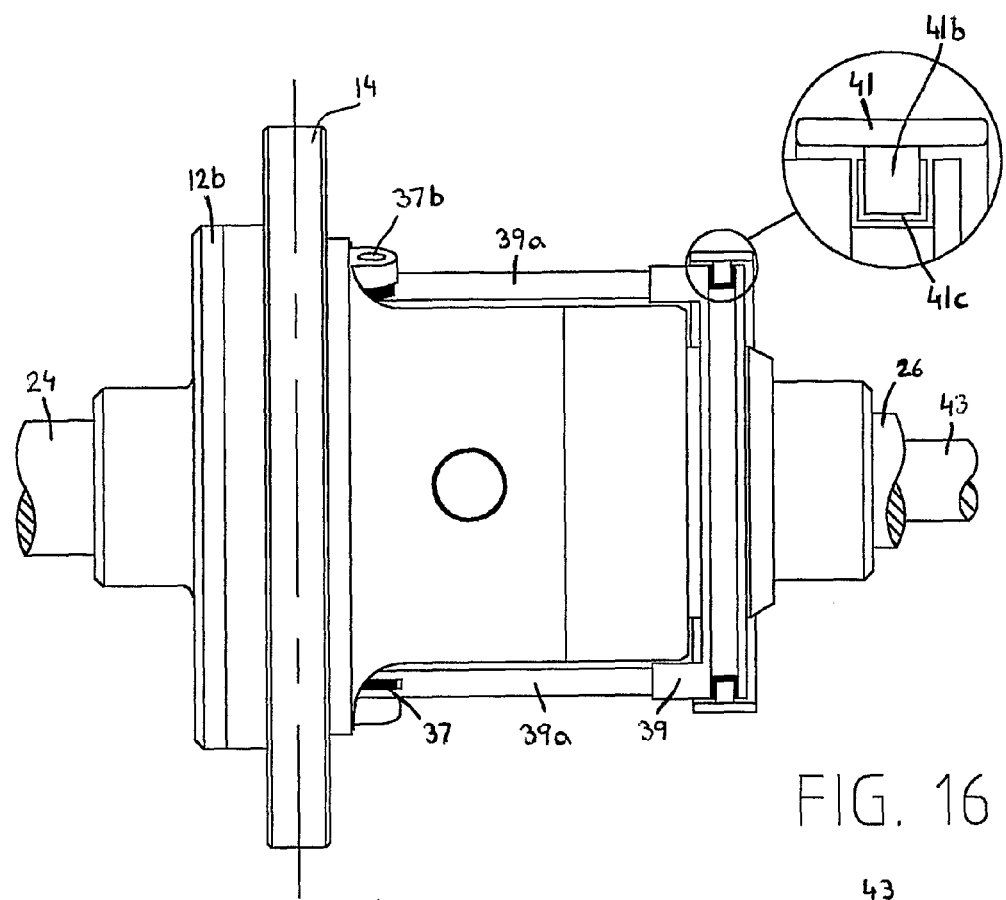
FIG. 16 is a view analogous to FIG. 15 but rotated 90 degrees around their common axis.
Figure 15:
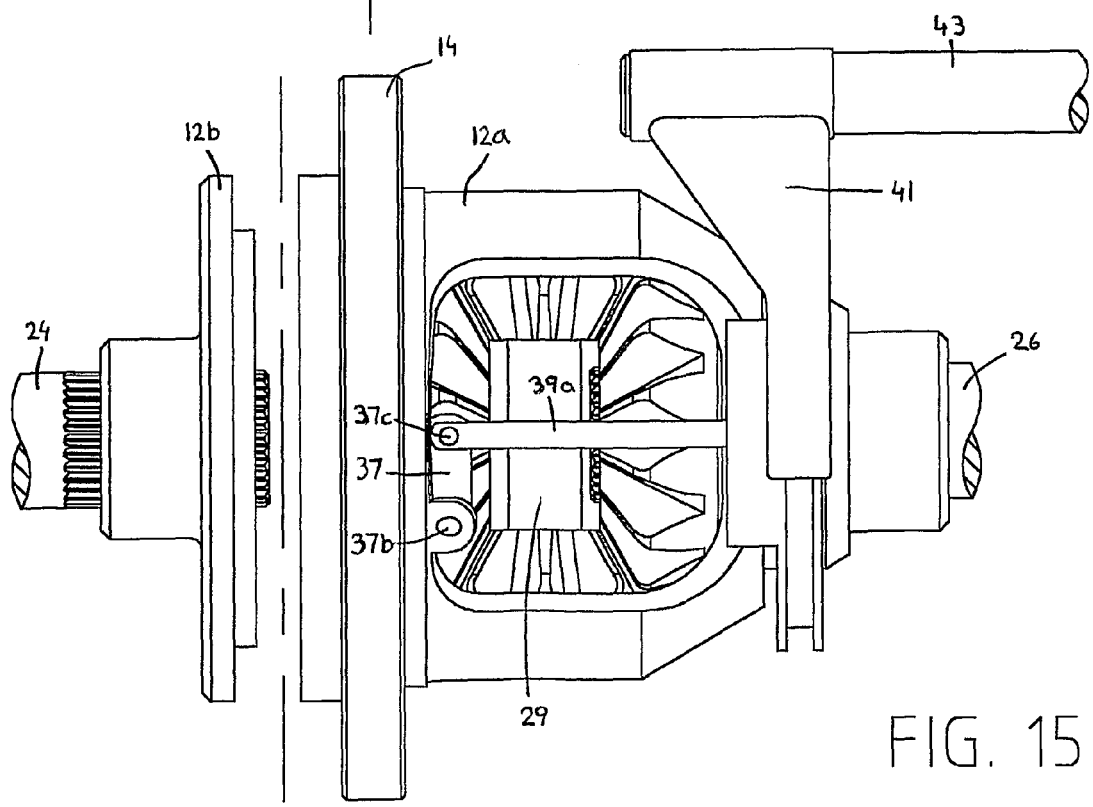
FIG. 15 is a view of the present invention according to the second embodiment.
Figure 18:
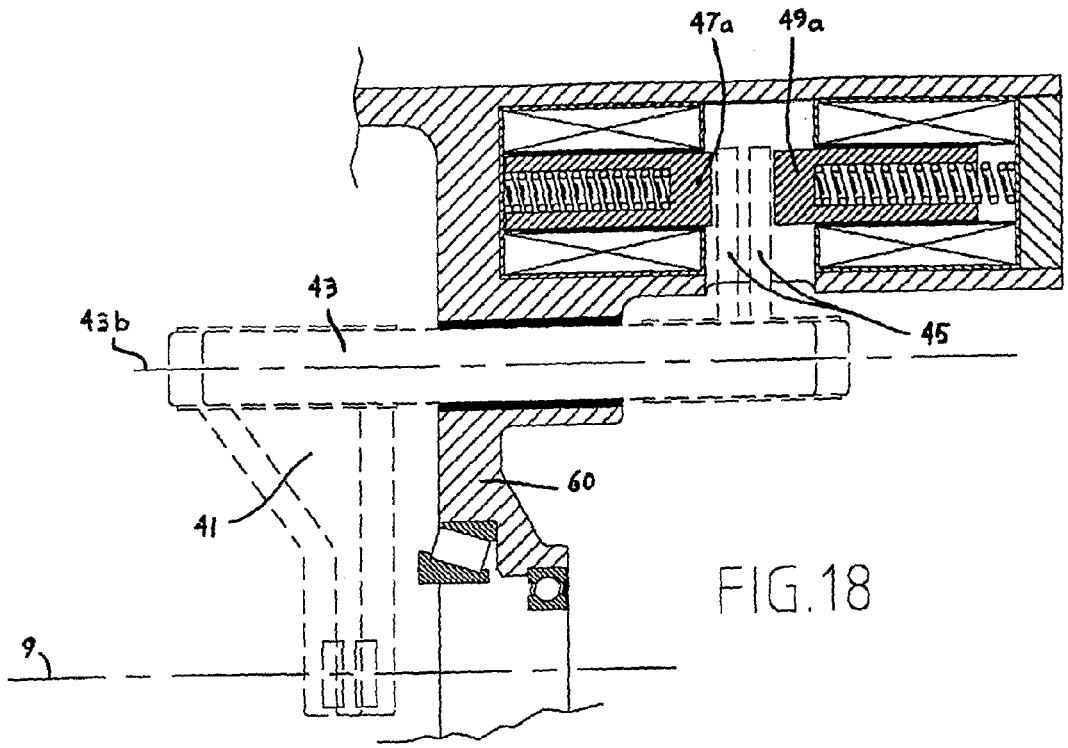
FIG. 18 is another partial cross-section of the mechanical signal system of the second embodiment of the present invention.
Figure 17:
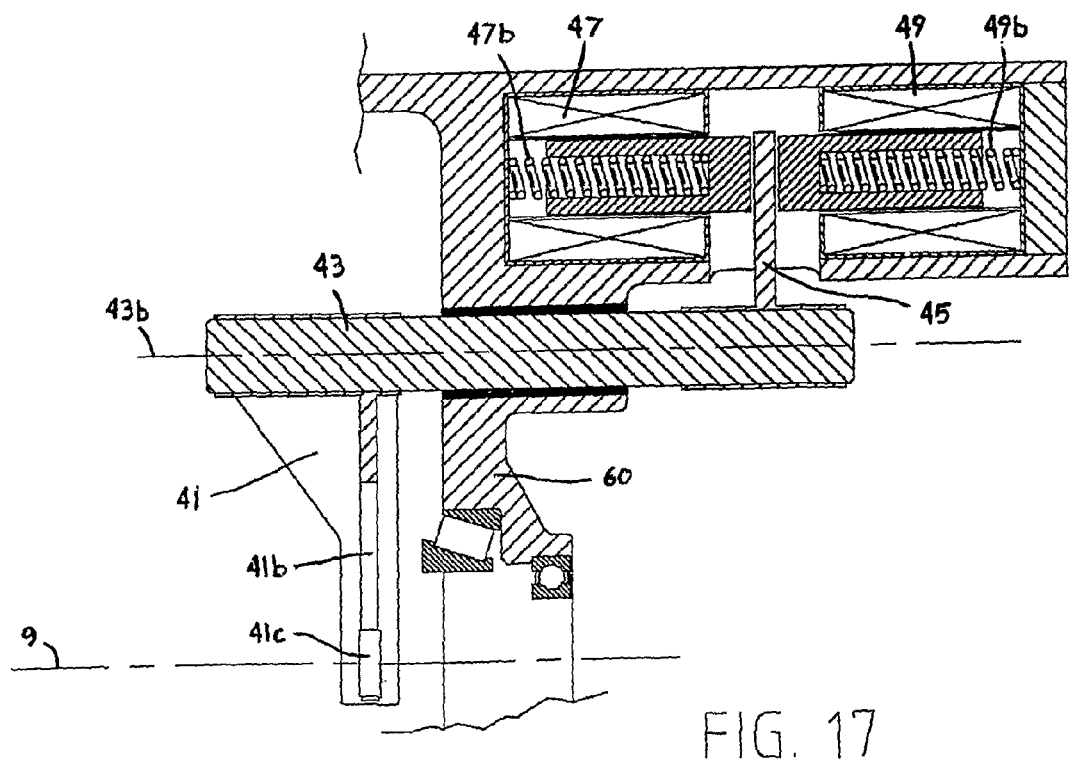
FIG. 17 is a partial cross-section of the mechanical signal system of the second embodiment of the present invention.

Referring now to the drawings, which are not intended to limit the scope of the invention to the exact design shown, but rather to enable any person skilled in the art, to make use of its qualities.

FIGS. 1-18 shows in detail the preferred embodiments, which consist of an input shaft in the form of a differential cage 12 which consists of its main part 12a and its end cover 12b which together form a generally cylindrical body with an inner cavity 13. The outer surface of the cage 12 includes a flange 14 to, in a conventional way, accommodate a ring gear or the equivalent (not shown). The differential cage 12 also at each end includes a pair of hollow stub axles 16, 18. The inner and outer surfaces of said stub axles are both concentric to the rotational axis 9 of the differential cage 12. the inner cavity 13 of the differential cage 12 accommodates a pair of planetary wheels 28 and two output shafts in the form of the two side wheels (sun wheels) 20, 22. The output shafts/side wheels 20, 22 are concentrically arranged in relation to the differential cage 12 and its rotational axis 9. The planetary wheels 28 sit on a pinion shaft 29 whose axis direction deviates 90 degrees from the rotation axis 9 of the cage. The pinion shaft 29 is fixated to the cage 12 such as the planetary wheels 28 revolve with the differential cage 12 around its rotational axis 9. Each of the planetary wheels 28 as well as the side wheels 20, 22 are in themselves free to rotate about their own rotational axis. The cogs of the planetary wheels 28 meshes however with the cogs of the side wheels 20, 22 such that the mean rotational speed of the side wheels 20, 22 always equals the momentary rotational speed of the differential cage 12. The side wheels 20, 22 have internal serrations which are engaging corresponding serrations 21, 23 on the two drive shafts 24, 26. Besides the above mentioned, on differentials conventional parts, one side of the internal cavity 13 of the differential cage 12 is equipped with a cam profile 32. Said cam profile is concentrically arranged to the rotational axis 9 of the differential cage 12. Besides said cam profile, the present invention is equipped with a cylindrical roller race 30. Said roller race is an integrated part of one of the side wheels 20 and it is also concentric to the rotational axis 9. Around the periphery of the roller race 30, between itself and the cam profile 32 there is a number of cylindrical rollers 31. The number of said rollers corresponds to the number of cam valleys 32a and cam hills 32b. The radial distance between the cam hills 32b and the periphery of the roller race 30 is less than the diameter of the rollers 31. The space between the roller race 30 and the cam profile 32 contains besides the rollers 31 also a cylindrical roller cage 33. Said roller cage has a number of cut outs 33a, the number of which corresponds to the number of rollers 31. The pitch circle of said cut outs corresponds to the pitch circle of the cam profile 32. Between the roller cage 33 and the roller race 30 there are two resilient elements 34. Said resilient elements are fixed in relation to the roller cage 33 by two cut outs 33b, and they are configured to give a friction force against the roller race 30. Said friction causes the roller cage 33 to try to follow the rotation of the roller race 30 that takes place during differentiation. If this rotating movement (relative to the differential cage 12) of the roller cage 33 is allowed to happen, it will cause the rollers 31 to be forced by the cam ramps 32c into contact with the roller race 30. (The rollers are normally during operation positioned in contact with the cam profile thanks to the centrifugal force.) When the rollers 31 gets into contact with the roller race 30 the friction of their contacting surfaces and also the contacting surface of the cam ramps 32c will try to wedge the rollers 31 in between the cam ramps 32c and the roller race 30. This wedging action will stop any further differentiation in the present direction. In order not to cause every differentiation to be stopped at the very starting instant the roller cage 33 most be forced to, in spite of the friction force of the resilient elements 34, stay in a position where the cut outs 33a of the roller cage and hence also the rollers are positioned right opposite to the middle of the cam valleys 32a.

In a first embodiment of the present invention this is accomplished by two cavities 33c in the roller cage 33 in collaboration with two pairs of pegs 36a, 38a, which are in terms of rotation relative to the rotational axis 9, fixed to the differential cage 12. Said pairs of pegs are however axially movable in relation to the differential cage 12 and two by two rigidly fixed to two ring shaped elements made of magnetically conductive material 36, 38, which by means of a number of bolts 36b, 38b and a number of coil springs 36c, 38c are kept in resilient contact to the end-cover 12b of the differential cage. Said ring shaped elements 36, 38 has differently sized diameters and are both concentrically arranged in relation to the rotational axis 9 of the differential cage. When both said ring shaped elements 36, 38 is in their respective spring loaded positions, both said pairs of pegs protrudes through the end-cover 12b of the differential cage and into said cavities 33c of the roller cage. This means that the roller cage 33 is rotationally fixed in relation to the differential cage 12, in a position where the rollers 31 of the locking device 35 are in the middle of the cam valleys 32a of the cam profile. In order for the locking device 35 to be able to lock in one or the other direction there is, attached to the stationary transmission housing 60, in close proximity to said ring shaped elements 36, 38, two ring shaped electromagnetic coils 40, 42. If one of said coils, for example 40, is energized the corresponding ring shaped element 36 is magnetically excited and will thereby be displaced to its other end-position (even closer to but still not touching said electro-magnetic coil) and in so doing it will retract its pegs into the end cover 12b. In this position the roller cage 33 is free to make a, relative to the cam profile, rotating motion in one direction, to in this way allow the locking device 35 to lock any possible differentiation in said direction. In a similar way the other or both of the electromagnetic coils can be energized to regulate the action of the locking device in any direction.

In a second embodiment of the present invention, the roller cage 33 is connected to the differential cage 12 by two angular levers 37. Said levers have three each, in right angle positioned, pivot points 37a, 37b, 37c, of which the first 37a are connected to the roller cage 33 at its cavities 33b. The pivot points 37b are connected to the differential cage 12, whereas the points 37c are connected to two "linear rods" 39a. The object of the levers 37 is to transform the possible, in relation to the differential cage 12, rotational movement of the roller cage 33 into a linear ditto, parallel to the rotational axis 9 of the differential cage. The linear rods 39a is in their other ends connected to the sliding sleeve 39 which is fixed to the differential cage 12 in a way that it can move axially but not rotate in relation to the differential cage. The sliding sleeve 39 transmits by the means of its circular groove 39b possible linear movements to the "linear fork" 41. Said linear fork has a flange 41b onto which two anti-friction caps 41c are attached. Said anti-friction caps are the only parts of the linear fork 41 that touches the sliding sleeve 39. The linear fork 41 doesn't rotate together with the differential cage 12 and the sliding sleeve 39 but is fixed between the sliding sleeve 39 and the linear shaft 43. Said linear shaft is supported in the stationary transmission housing 60 in a way that it is free to move axially along the axis 43b, parallel to the rotational axis 9 of the differential cage. Onto the linear shaft 43 there is a rigidly attached bracket 45. On each side of said bracket there is an electromagnetic actuator 47, 49, the armatures 47a, 49a of which, by the means of the two coil springs 47b, 49b, are mechanically rebounding. In their rebound positions the armatures 47*a*, 49*a* only just reaches the bracket in its centred position. The spring force acting on said armatures is stronger than the force that, during differentiation, through the linear shaft 43, acts on the bracket 45. If none of the electromagnetic actuators 47, 49 are in their energized positions the force of the coil springs 47*b*, 49*b* will act as the passive signal that enables the differential to differentiate freely in any direction. If one of the electromagnetic actuators are energized the differential is free to differentiate in one of its two directions, whereas it is prepared to immediately lock any differentiation in the opposite direction. If both of the actuators 47, 49 are energized the locking device 35 is prepared to lock any differentiation regardless of direction as soon as it starts. If one of the actuators is de-energized when the differential is locked the spring force can, (on the condition that the spring force is high enough and/or the locking force of the locking device is light enough), unlock the locking device 35.

The present invention consists of a conventional differential gear combined with an adjustable locking device. Said adjustability refers to the fact that it by means of a mechanical signal can be set to four different working modes.

Furthermore the locking device as such is "self locking" as well as "self unlocking", i.e. it has the ability to lock a beginning differentiation all by itself. It also has the ability to unlock itself if the differentiation would start in the opposite direction. From this it can be seen that the locking device is what could be described as "direction sensitive", i.e. it can only be locked in one direction at a time. This characteristic of the locking device gives the differential gear of the present invention the possibility to be; potentially locking for differentiation regardless of direction; fully open for differentiation regardless of direction; open for differentiation only in one direction and lastly open for differentiation only in the opposite direction. To decide which of these four working modes is the most appropriate at any given instant it can for example be complemented by an electronic control unit. This "ECU" can obtain information from the individual wheel speed sensors of the ABS system as well as steering-wheel angle sensor, yaw-rate sensor acceleration sensors, throttle position sensor etc. By means of the direction sensitiveness of the locking device it can, given the appropriate working mode in cornering manoeuvres, find and react to the aforementioned crossover point on its own accord. And it will react to it by being fully open below the crossover point and fully locked above it. Since it at the crossover point is no differentiation taking place and the torque distribution is exactly balanced between the two output shafts, the possible locking/unlocking in itself, will not be detectable by the driver.

The locking device according to the preferred embodiment consists of a (generally cylindrical) outer internal cam profile integrated to the inner cavity of the differential cage, an inner external cylindrical race integrated to one of the side wheels, concentrically arranged to said cam profile and a number of cylindrical rollers located between the inner race and the outer cam profile. The distance between the hills of the cam profile and the inner race is less than the diameter of the rollers. To keep the rollers from randomly locking the device, they are localized by a roller cage, the pitch circle of which corresponds to the pitch circle of the cam profile. Said roller cage is concentrically arranged in relation to the inner race and the outer cam profile and is also in itself rotationally movable in relation to the differential cage and the inner race, however there is a small friction between the roller cage and the inner race. Said friction means that the roller cage, during differentiation, tends to follow the, in relation to the differential cage, rotating movement of the inner race. The movement of the roller cage is however due to the cam profile and the rollers located in its valleys, restricted to one or a few degrees of rotation. Exactly how big this movement is going to get depends, when it's not further restricted by the mechanical signal, upon the size of the clearance between the race, rollers and the cam valleys and also by the ramp angle of the cam hills. If the roller cage and the rollers are allowed to make this (relative to the differential cage) rotating motion, the rollers will be forced, by the cam ramps, into contact with the inner race. The friction that will arise from this contact will try to wedge the rollers between the inner race and the cam ramps which mean that the whole assembly will lock. The purpose of the aforementioned mechanical signal is to allow or not allow the roller cage to make the described rotational motion in one or the other direction, in relation to a neutral position. Said neutral position is characterized by the fact that the rollers can't bridge the radial distance between said cam profile and said inner race. Due to its direction sensitiveness the locking device can, depending on the mechanical signal, be made to allow differentiation in one or the other direction but fully lock the differentiation in the opposite direction. By changing the signal the locking device can be made to either allow differentiation in both directions, or fully lock the differentiation regardless of its direction. Even in this last mentioned mode the locking device is direction sensitive, what is meant by this is that when the unit is locked, it is always only locked in the present direction and it is always free to unlock if the differentiation would start to differentiate in the opposite direction. Then it is up to the signal if the locking device will let the differentiation continue in the new direction or if it will lock again. If the signal allows it to lock again, this unlocking and relocking in the opposite direction happens within a few degrees of differentiation and even if the unit for all practical reasons appears to be locked during this happening it actually has both unlocked and relocked again.

It is as has already been mentioned, never the signal itself that locks the locking device. Instead, the locking device utilizes (by the means of the friction between the roller cage and the race) the differentiation energy, i.e. the torque imbalance between the two output shafts, to initiate the locking on its own accord. Even after this initiation, the locking device utilizes that same energy, now by means of the static friction between the cam ramps, rollers and the inner race to fully lock in the present direction. The magnitude of this energy depends on the instant torque difference between the two output shafts, which in itself ultimately depends on the instant resistance difference between the road surface and the tyre of each drive wheel. In other words it is these differentiated resistances that in every instant determine how hard the locking device is locked. At large difference between the resistances of each output shaft, the locking device is strongly locked; at smaller difference the locking is lighter. If the difference gets totally evened out and the resistance of the drive wheel that previously made the hardest resistance even tends to get lighter than the resistance of the other drive wheel, then the locking device will automatically unlock. At this time it will once again be up to the signal, if this difference between the resistances of the drive wheels will be used only to drive the differential action and in so doing get practically evened out, or if it will be used to lock again and in so doing allow the difference to grow as big as the instant resistances of the drive wheels will admit.

It is, as previously described, never the signal itself that locks the locking device, however it can occasionally be necessary to unlock the locking device at the command from the ECU. If the differential for example would be locked when the vehicle is just about to start a cornering manoeuvre and the locking device in addition happens to be locked in the direction that the control logic would allow, then the locking device must be forced to open. This can be accomplished on two different principles, either directly through the mechanical signal that normally is used to possibly prevent it from locking, i.e. to utilize the mechanical signal to force the roller cage to the previously described neutral position. In spite of the fact that this unlocking only will require a fraction of the force that keeps the unit locked and the fact that this force probably at this point will be fairly low, this signal still will have to be considerably stronger (to guarantee a successful unlocking in every circumstance) than it would have to be if it would just be used to prevent the locking. In addition the signal would need to be capable of giving the roller cage a small rotating movement. (One other alternative would of course be to use a completely separate signal to in a similar way unlock the locking device.) Said principally different way to unlock an already locked unit from the outside on the other hand, utilizes the ability of the locking device to unlock itself. This can be accomplished by consciously manipulating the resistances of the output shafts. This manipulation can be done by applying the wheel brake of the wheel that the logic sees as the "future" outside drive wheel. This braking impulse that can be very brief can easily be accomplished by using the hardware of the ABS system in the similar way that ASR and ESP systems do. If this invention is to be used in vehicles using these kinds of systems, its control logic can and should be designed to collaborate with the logic of those. The previously mentioned mechanical signal consists of some kind of actuator. This/these actuator/s translates the decision of the control logic into relevant mechanical movement, to in this way adjust the mechanical function of the locking device, i.e. to allow or not allow the aforementioned rotating movement of the roller cage. Since the differential gear as such can differentiate in two different directions and the mechanical signal has two possible signal levels (yes/no) in each direction, this will give the locking device four different working modes. One way to translate the decision of the control logic into a mechanical movement that will make these four working modes effective is to, as in the preferred embodiments, use two actuators with two signal levels each.

To make a simplification one can say that the purpose of the invention is to automatically lock any beginning differentiation when driving straight ahead (since that kind of differentiation doesn't serve a purpose). In cornering manoeuvres on the other hand the differentiation is allowed to occur at the highest possible efficiency but only for as long as it occurs in the theoretically "right" direction. Any beginning differentiation in the "wrong" direction will be automatically locked. (Since the differentiation at this point no longer serves a purpose). From a torque distribution perspective this means that when driving straight ahead, each drive wheel will be assigned anything between 0-100% of the input torque depending on their individual traction. During cornering the inside drive wheel will get anything between ~50-0% of the input torque depending on its traction whereas the outside drive wheel will get the rest, i.e. anything between ~50-100% of the torque.

Since the locking device as such, if it isn't prevented, will lock itself within one or a few degrees of differentiation and also since the open differential will not mean any disadvantages for as long as none of the drive wheels are approaching their traction limits, the default mode should probably be the open mode. Besides the fact that the control logic in this way in many cases will not have to intervene and unlock the locking device, it also will not lead to any major problems if the ECU would be out of order, or if the vehicle would for example be pushed without any power supplied to the ECU and the actuator/s. To accomplish this one can, as in the preferred embodiments, equip the signal system with some kind of passive signal that, in spite of the aforementioned small friction, will prevent the roller cage from making a rotating motion during differentiation. Said passive signal can as shown be accomplished by means of a mechanical signal in the form of two mono-stable actuators which are arranged in a way that their respective stable position will prevent the locking device from locking in each differentiation direction. With the mechanical signal system arranged in this way the control logic must give an active signal to position the one or the other or both of the actuators to allow the locking device to lock. It should be noted that it still isn't the signal itself that locks the unit, but as already has been stated, that it in its effected position only, allows the locking device to lock itself.

The primary objective of the control logic is to evaluate the incoming data to "classify" the momentary driving situation and from this "classification" choose the most appropriate of the four described working modes. Said classification is primarily a question of drawing the line between "straight ahead" and the respective "turning modes", i.e. "left hand corner" and "right hand corner". Drawing this line could appear to be quite obvious but when it comes to the function of the present invention, its qualities (contrary to limited slip differentials) gets more and more pronounced as the turning radius decreases. The reason for this stems from the combination of its "either/or characteristic" (i.e. either fully open or fully locked) combined with its ability to react to the aforementioned crossover point (i.e. its direction sensitiveness). This means that it is quite easy to decide upon the right working mode on a tight corner. However, "closer" to straight ahead it is somewhat harder to say for sure which working mode is the most appropriate. If the logic for example would simply select the "right hand corner mode" as soon as it detects the smallest deviation from straight ahead, then the present invention would theoretically fail to solve a little less than half of the possible problems of "one wheel spin" if and when they would occur. Since a totally locked differential wouldn't fail to solve any such problems and also would not mean any real disadvantages at least for as long as the vehicle travels close enough to straight ahead, this implies that said "straight ahead mode" could be made more or less wide depending on the preference of the vehicle manufacturer. Moreover, the locking devise could besides from the totally locking position be fully open for as long as none of the wheels are approaching their traction limits, as has already been described. If this invention is arranged in the latter way, the objective of the control logic at "straight ahead" would be to watch over the individual wheel speeds as well as the throttle position etc. to determine if there is a risk of any drive wheel to approach its traction limit. Only when this is the case the signal would change to allow the differential to instantly lock itself. This situation could be described as "straight ahead with risk of one wheel spin". In this way we have got four potential driving situations to be properly matched to the respective working modes of the differential. By letting the open mode be the default mode of the differential, most corner entries can be carried out exactly in the same way as with an open differential. If the deviation from exactly straight ahead would for example occur to the right, then the differential should instantly be adjusted to a position where the right output shaft could not overrun the differential cage, since such a differentiation would under no condition be wanted. In this case the control logic would only have to watch out for any differentiation in excess of the theoretical differentiation, deviations in the other direction is allowed only for as long as the crossover point isn't exceeded, if it is it will be automatically corrected by the mechanics of this invention. One could in other words say that the "line" between straight ahead and the respective turning mode should be more or less overlapping. The real decision to be made when it comes to the "line" between straight ahead and the respective turning modes will be to decide upon when it is going to be a "clean" turning mode, i.e. when the control logic no longer should intervene if and when the differentiation in the "right" direction would grow bigger than the theoretical differentiation. If the vehicle for example would drive relatively fast through a fairly tight right hand corner on a country road and the control logic classifies the driving situation as a "clean" right hand corner, then the left drive wheel would be allowed to rotate at higher speed than the right one. This would also mean that the differentiation could even exceed the theoretical differentiation even if this, owing to the previously mentioned load transfer, becomes less and less probable (except possibly very momentarily for example owing to irregularities in the road surface) the tighter the corner radius or the higher the speed. If the rotational speed of the right output shaft on the other hand, during acceleration, would exceed the rotational speed of the differential cage and hence also that of the left output shaft, the differentiation would automatically get locked at the very starting instant. The left output shaft is however always free to once again exceed the rotational speed of the right output shaft, for as long as the present classification remains. If the differentiation after all would exceed the theoretical differentiation, then the control logic should, if nothing else for safety reasons not intervene to allow it to lock, but rather if the vehicle is equipped with some kind of traction control system, possibly let that decrease the input torque to avoid the risk of outside wheel spin. This said first and foremost because the drive wheels during cornering, except for their task to transform the engine torque into a tractive effort, also must supply lateral support to outbalance the centrifugal force caused by the lateral acceleration. All of the above reasoning is applicable first and foremost when the vehicle is travelling at speed. When starting off or during really slow driving, adverse road conditions and real off road driving on the other hand, the control logic could by all means let the differential lock if the differentiation would exceed the theoretical differentiation to a significant extent. It will however in this case be a slightly more abrupt locking since it at the locking moment already is some differentiation taking place. There is of course also the possibility to let a possible ASR-system increase the resistance of the outside wheel by applying a pressure to its wheel brake to avoid it to spin up. In favour for the latter speaks the facts that the relatively lower traction of the outside drive wheel could be merely momentary and if so, when its traction increases again, with the differential in a locked position, the inside drive wheel will be forced to continue to deliver the greater part of the tractive effort and exactly as is the case with the spool, this will also mean that the yaw resisting moment will remain even if the driven axle will not be assigned any torque from the engine. This example also illustrates, the for this invention important fact, that there are two theoretically different reasons for a torque imbalance between the two output shafts. One of which is the different abilities of each drive wheel to transform its torque into a tractive effort, which we unconditionally could let the locking device take care of. The other one is the geometrically imposed reason, derived from the different distances covered by each drive wheel during cornering, (which can give the output shafts torque acting in different directions) which we ideally should let the open differential minimise as per its best ability. This example also illustrates the fact that both of these reasons must coincide to enable "outside wheel spin" to occur, and even though there is no basic problems associated with locking the differential for as long as both of these reasons prevail it should be strongly noted that if and when the first reason would disappear the other reason remains, which means, the differential should in one way or another be forced to unlock, at least if the corner radius is small enough or if it would happen to be diminishing. Even if all of this reasoning should merely be regarded as a very simplified base from which to develop a control logic for this invention, one can se that the above mentioned overlapping should be varied in a way that it will be more pronounced at for example lower speeds and/or adverse road conditions. Depending on the amount of sensors feeding the ECU with data, the control logic could be made more or less advanced when it comes to judging the intentions of the driver, the instant road condition etc. Ultimately one can in this way fine tune the influence of this invention to the driving dynamics of the vehicle by means of the control logic. One small but very important detail to observe is the fact that when the vehicle is in reverse gear, the control logic must also reverse the signals to the actuators of the differential gear to make it work as intended.

FURTHER EMBODIMENTS

The above in detail described embodiment of the present invention is one way to achieve the likewise above described objective of the invention. The actual design of the invention to achieve this objective can however in several different ways differ from what is in detail described. The locking device could for example consist of any kind of self locking and self unlocking locking device that can lock itself in both directions. The expressions self locking and self unlocking means in this context that they have the ability to use the same energy that drives the differentiation in the first place, to initiate the locking action and also use the same energy to generate the locking force to fully lock any further differentiation in that direction for as long as said differentiation energy (i.e. imbalance) remains. In FIG. 8 and FIG. 9 two alternative locking devices 35 are shown. As in the above in detail described locking device, both of these locking devices have two elements each 30*, 32* rigidly connected to two of the three shafts of the differential and a number of movable locking elements 31* whose task is to achieve the wedging effect between said rigidly connected elements that prohibits the continuation of the differentiation in the present direction. (The designation * is meant to make the reference "wider" in a way that for example 31* can mean both 31 and/or 31*x* and/or 31*z*) Apart from said movable locking elements 31* they also comprise a movable control element 33*. Said movable control element has a number of functions, these functions are partly to keep said locking elements in a settled condition and partly to, by the means of friction, use the differentiation energy to initiate the locking function. Apart from said functions it also has the function of controlling the action of the locking device. This is achieved by the means of the aforementioned signal which is designed to control the clearance or play of the control element in both directions separately from a central/neutral position. In this way the action of the locking device and hence the action of the whole differential can be controlled.

Figure 21:
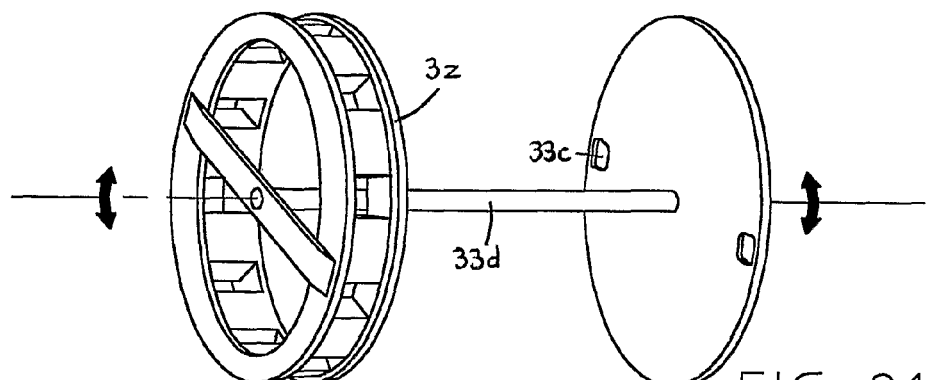
FIG. 21 is a perspective view of the roller cage etc. according to the same embodiment as shown in FIGS. 19 and 20.
Figure 20:
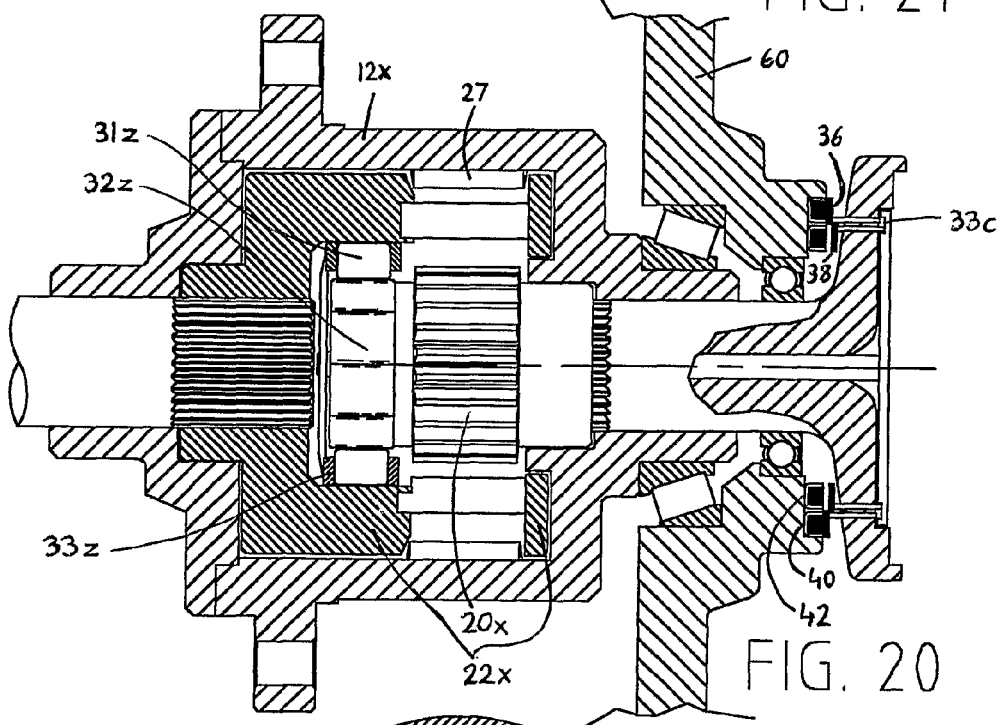
FIG. 20 is a radial cross-section of the same differential gear as in FIG. 19.
Figure 19:
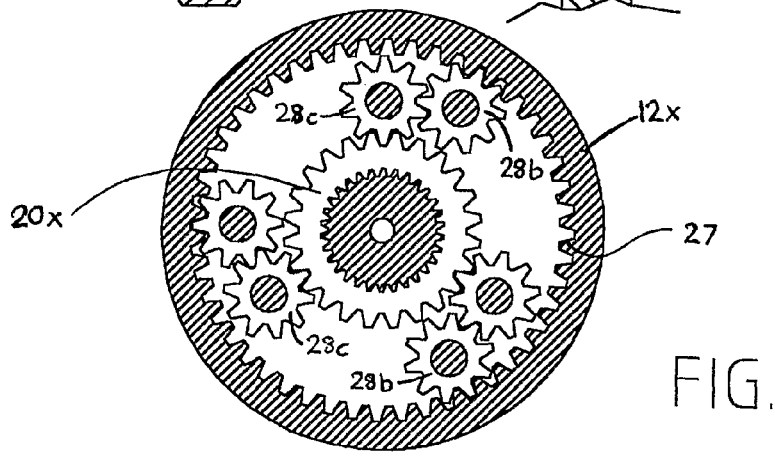
FIG. 19 is an axial cross-section of the differential cage of a differential gear (25) according to an alternate embodiment.
Figure 22:
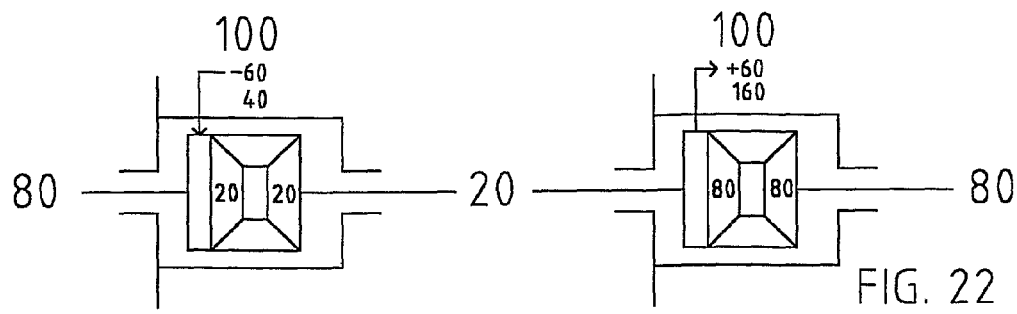
FIGS. 22-25 is a number of schematic views of four different embodiments of the present invention in their respective locked positions, intended to illustrate their torque paths at two examples of torque distribution, wherein the left example sees a higher resistance in its left output shaft whereas the right example represents the reversed condition, the numbers in these schematic views represents the percentages of the total input torque.
Figure 23:
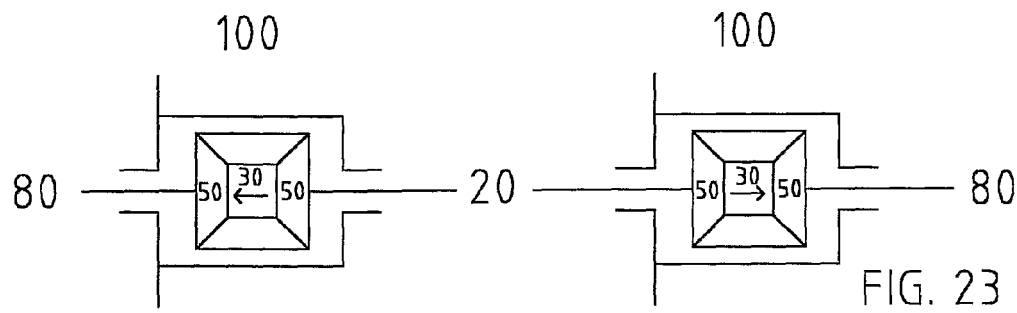

When it comes to the placement of the actual locking device within the differential, this doesn't necessarily have to be according to the above in detail described embodiments to achieve the objective of the present invention. Since all of the three shafts of the differential rotate relative to one another during differentiation the locking device can be placed between either one of them. If the locking device for example would be placed directly between the two output shafts, then the torque that would load the locking device would of course be equal to the difference in torque that exists between the two output shafts (FIG. 23). If the locking would occur between the input shaft and one of the output shafts as in the detailed description above, the load of the locking device would actually be twice as big as the imbalance that at every instant would be present. (This is due to the fact that the relative rotation between the input shaft and either of the output shafts at a given differentiation rate is only half of the differentiation rate as measured directly between the output shafts.) Apart from this disadvantage, this "asymmetric" placement of the locking device also leads to a greater load on the differential gear itself when the locking device is locked in one specific direction, whereas it leads to a lower load when it's locked in the opposite direction (FIG. 22). These theoretical disadvantages are however probably compensated by practical advantages when it comes to available space for the locking device and also when it comes to accessibility concerning the aforementioned signal. Concerning available space the above stated is especially relevant to the most common (and cheapest) kind of differential, i.e. the in detail described bevelled gear variant, and to a lesser extent for example for the type of differential gear commonly used for "limited slip" differentials of the "viscous" variant. I.e. a differential gear wherein one of the output shafts consists of a cylindrical spur wheel and the other consists of a "planet carrier". One example of a differential gear according to this layout and with a locking device placed directly between the output shafts is shown in FIG. 19 and FIG. 20. In this embodiment of the present invention the differential gear itself consists of an input shaft in the form of a differential cage 12x. Said differential cage 12x differ from the above described differential cage 12, by the fact that it instead of transferring the torque to the output shafts 20, 22 through the pinion shaft 29 and the bevelled planetary wheels 28, utilizes an integrated internal spur wheel 27 to transfer said torque through a number of planetary wheel pairs 28b, 28c (not shown in FIG. 20) to the two out put shafts, consisting of one cylindrical spur wheel 20x and one "planet carrier" 22x. Concerning the accessibility of the signal, the signal system must in this as well as in the previously in detail described embodiments, have some part rotationally fixed in relation to one of said two, to the three shafts of the differential gear rigidly connected elements 30*, 32*. Since it in this case means one of the output shafts which both are enclosed by the (when in motion rotating) input shaft, the movable control element (in this case 33z) for example can be equipped with an integrated control axle 33d which passes through a hollow drive shaft, to in this way give a possibility to regulate said control element from the outside as shown in FIG. 20 and FIG. 21. (The designations 36, 38, 40, 42 and 33c represents parts of the exact same function as is described in the detailed description of the preferred embodiment even if they in this case have a different location.) (In the present example a locking device according to FIG. 9 is used but the same basic function could be had with for example locking devices according to FIGS. 3-7 or FIG. 8.)

Figure 24:
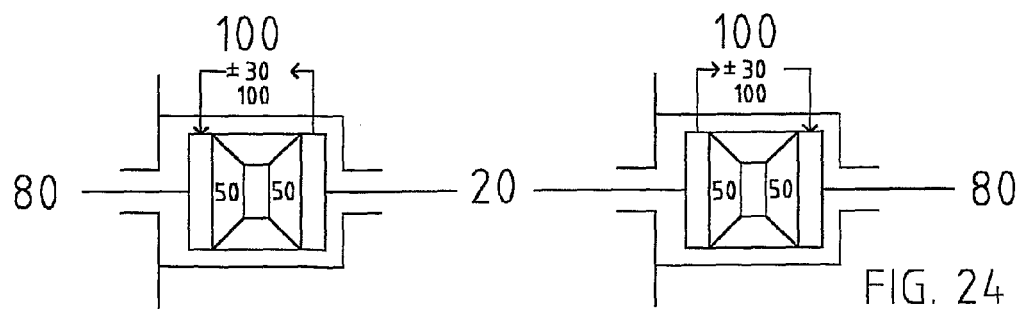
Figure 25:
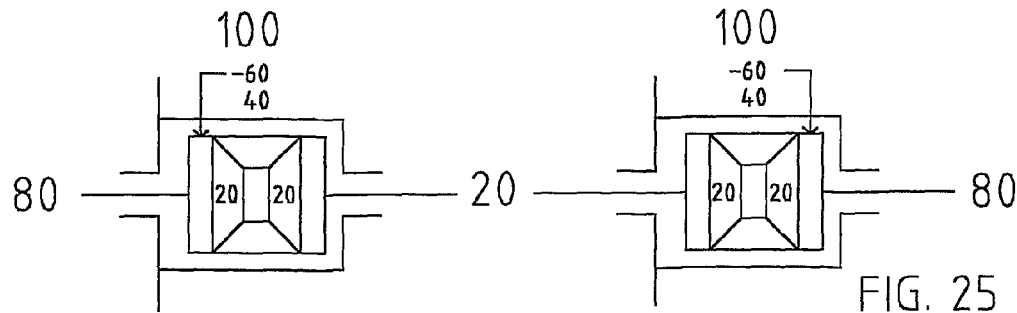

Another way to get round the above mentioned theoretical disadvantage would be to use two locking devices, one between each of the output shafts and the input shaft. Such an embodiment would however probably be more expensive, partly due to more components needed and partly due to tight tolerances to assure a synchronous locking effect and hence an equal locking force at both of the locking devices (FIG. 24). Yet another way to avoid an increased maximum load on the differential gear itself but not on the locking device would be to in the described way use two locking devices but only let one of them lock at a time and in this case only the one at the output shaft with the greatest resistance (FIG. 25). In all of the above described embodiments two electromagnetic actuators are used to control the action of the locking device. It is to be understood that this task can be made by other kinds of suitable actuators.

Fundamental to achieve the above described function of the present invention is that the locking device can be regulated to allow or not to allow differentiation to take place, separately for each differentiation direction.

It is a well known fact that a deteriorated or blocked differential action will give rise to an under steering moment about the Z-axis of a vehicle during engine braking or when free rolling (i.e. neither positive nor negative traction forces). If there is a positive tractive effort from the engine/transmission it is not possible to, in the same generalised way, decide in which direction a more or less deteriorated differential action will effect the vehicle with regard to under or over steering moments but as has already been described, the deteriorated differential action will generate an under steering moment for as long as the vehicle finds itself under the above described "cross over point", whilst above the very same it will generate an over steering moment.

To be able to, in (close to) every conceivable driving situation, have control over the drive force related over and under steering moments, without undue energy losses (i.e. without achieving said moments from individual braking), there must except the possibility to limit a possible differentiation also exist a possibility to actively be able to force a differentiation. Systems that are able to accomplish this are usually labelled "active yaw control" systems (AYC). A few examples of such systems are described in the following U.S. Pat. No. 4,973,296, U.S. Pat. No. 5,370,588 and U.S. Pat. No. 5,415,598. These patents all utilize some kind of up and/or down gearing apparatuses, (either between the incoming and both alternatively only one of the output shafts or directly between both of the output shafts of the differential) together with two more or less infinitely variable torque transmitting couplings, alternatively only one such coupling including one switching connection between an up or down gearing apparatus arranged in series with the infinitely variable coupling. Each part of said up and/or down gearing apparatuses including disk clutch/es or the equivalent must be dimensioned to cope with the maximum difference between the torques of the left and the right drive wheels respectively. (Said maximum torque difference between each drive wheel generally occurs during hard acceleration out of a cornering situation.) Another way of actively achieving differentiated rotational speeds at the output shafts of a differential is to, as in Pat. No. DE10333640, design the differential gear itself as a hydraulic motor which can be driven in either direction by a hydraulic pump and a direction switching valve. Yet another way of achieving a similar effect is described in Pat. No. DE10333641 where a differential gear is supplemented by two hydraulic machines with cross connected hydraulic circuits, in which at least one hydraulic machine has a variable displacement and hence can be regulated as to either work as a pump or a motor. An AYC-device according to these principles is limited concerning maximum achievable torque difference by the maximum hydraulic pressure that can be achieved/tolerated.

By way of combining the above described function of the present invention with arrangements capable of achieving AYC, one can dimension the actual AYC device (hereinafter designated "torque redistributing device") to resist considerably smaller torque differences between each drive wheel than would otherwise be required. In this way one can achieve the over or under steering moments that advantageously can be applied to balance the total over or under steering tendencies of the vehicle during engine braking, constant speed and light acceleration. During acceleration straight ahead or close to straight ahead it is often sufficient with a limited decrease of the efficiency of the differential to avoid exaggerated wheel spin at either drive wheel. At hard cornering it is usually advantageous to have an over steering moment from the driveline on account of the fact that practically all vehicles are designed to be more or less under steering at or near the handling limit. This can normally be achieved by the means of the torque redistributing device but during hard acceleration out of a cornering situation the locking device can be utilized (if the above described cross over point is exceeded). I.e. if the torque difference gets to be higher than a preset maximum value, a disk clutch or the equivalent is allowed to "slip", alternatively for a hydraulic system some of the hydraulic pressure is allowed to "leak" to let the forced differentiation decrease, and eventually cease after which the locking device is allowed to lock, also noteworthy in this is the fact that this locking will not occur at the previously defined cross over point but at a point with higher slip rates and hence also higher torque at both drive wheels but in particular at the corner outer one. In this way the strain on the torque redistributing device can be limited while an over steering moment continuously can be applied without the continued need for one drive wheel to rotate faster than the other. Noteworthy in this is the fact that it in this situation is not possible to achieve an under steering moment at the axle of current interest irrespective of which kind of differential it would be equipped with (due to the limited frictional ability of the inside drive wheel). The only thing which could be done if exaggerated over steer would occur, (which especially with a rear wheel drive vehicle can occur), is (except ESP) to decrease the total amount of incoming torque to this axle, which would mean an equalising of the respective torque at each drive wheel, (decreasing over steering moment) this would, if the torque reduction would last, continue all the way until past the cross over point where the direction sensitive locking device would automatically unlock again and the torque redistributing device once again could be utilized to "fine tune" the balance of the vehicle in either direction. If we once again imagine the locking device to be locked and an over steering moment to still be advantageous from a balance point of view, then the torque redistributing device could be allowed to "try" to apply an over steering moment to the vehicle which, if the torque difference for whatever reason would decrease (less throttle, less lateral acceleration etc.), would lead the forced differentiation to restart at a given torque difference. From this we can see that a direction sensitively locked differential always is open for a forced differentiation in the over steering direction and that the locking and/or unlocking point of the locking device can be moved to a "location" more or less "above" the previously defined cross over point depending on the amount of torque the torque redistributing device at every instant is set to produce. In short one could say that one, with a combination of the previously described function of the present invention and a torque redistributing device, can have a full "active yaw control"—function with fully variable under or over steering moments without the need to dimension the torque redistributing device to cope with the torque differences which can occur during hard acceleration out of cornering situations. Apart from this there is also a possibility to utilize the torque redistributing device to directly unlock a locked locking device if that at any point would be preferred (assuming the instant torque difference is light enough).

Figure 26:
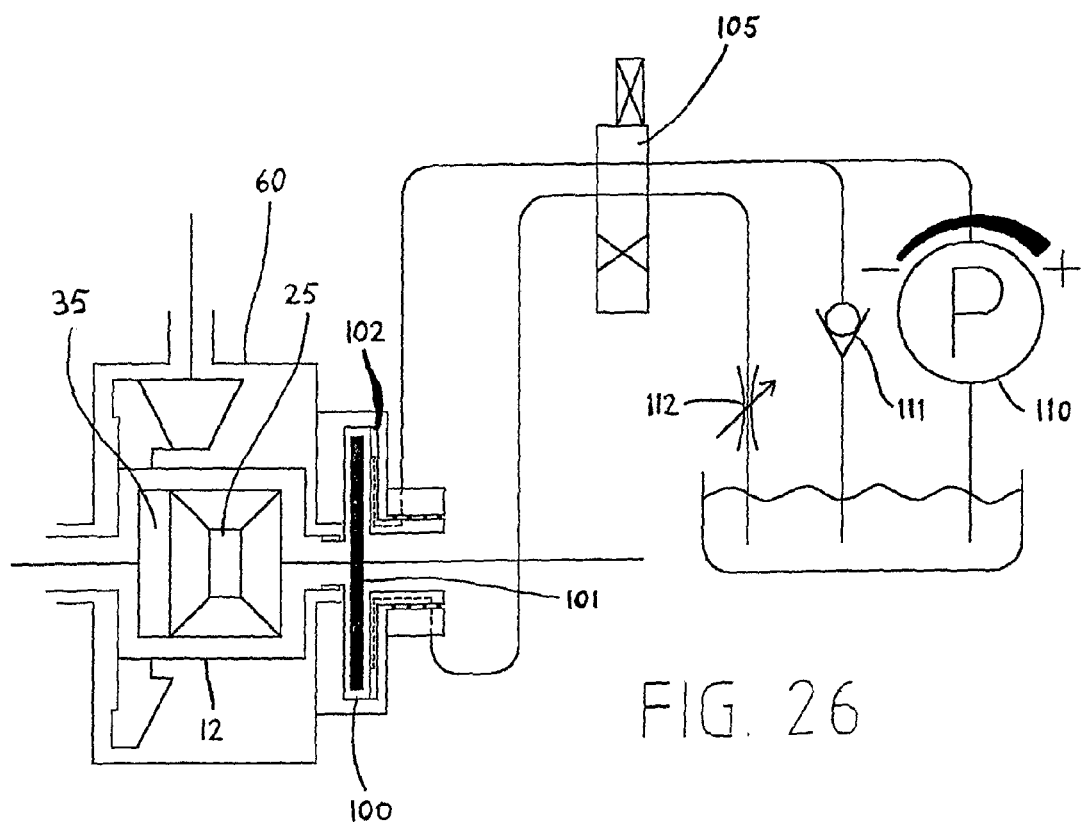
FIG. 26 is a schematic view of the present invention completed with an arrangement for "active yaw control".

The optimum way to influence the balance of a vehicle using the drive train requires the ability to achieve under as well as over steering moments about the Z-axis of the vehicle. All the above mentioned AYC-systems has this ability although the ones with a mechanical gearing is on principle less efficient in producing under steer than in producing over steer, this is due to the fixed gear ratio that is designed to be able to produce over steering moments even in tight corners, which calls for a considerably greater degree of (internal) slip to produce under steering moments, which means a greater loss. The direct hydraulic ones is somewhat better in this respect since these doesn't utilize a fixed ratio to be able to force a differentiation but instead utilizes a motor which when generating under steering moments works as a pump instead. Said pump can as in Pat. No. DE10333641 be used to drive another motor and in so doing reuse some of the energy, or in a simpler system one can simply choke the flow from the pump which is then driven by the normal differentiation (different resistances at each drive wheel). Said choking does of course also mean a loss but this loss is comparable to that of any kind of "limited slip differential" and consequently smaller than the above described. To totally get rid of said efficiency problem in a mechanical AYC-system one would need to use an infinitely variable gear ratio instead of the fixed one. One example of a system according to this idea is described in Pat. No. DE10241918. This is by the way practically analogous with what the variable displacement described in Pat. No. DE10333641 achieves by hydraulic means. Both of these systems can theoretically generate under as well as over steering moments at high efficiency, besides, this can be achieved regardless of the corner radius thanks to their infinite adjustability. FIG. 26 shows an alternative variant of a hydraulic AYC-system in which an ordinary bevelled gear differential 25 equipped with a direction sensitive locking device 35, can be forced to differentiate by way of a hydraulic motor 100, the rotor 101 of which is rotationally fixed to one of the two output shafts while the stator 102 is rotationally fixed to the input shaft 12 of the differential and consequently also rotating when the vehicle is in motion. By the means of a two way switching valve 105 and some kind of more or less infinitely variable incoming hydraulic pressure from a pressure source 110, it can more or less strongly force the differential to differentiate in either direction. (Said pressure source can for example consist of an intermittently driven hydraulic pump in combination with some kind of pressure accumulator and some kind of variable pressure regulator, or for example a hydraulic pump with an infinitely variable displacement.) At absent hydraulic pressure the differentiation can, owing to the non return valve 111, occur in a conventional way without the hydraulic motor, which now acts as a pump, creating a depression on its low side. By means of the infinitely variable choke valve 112 the differentiation can furthermore be more or less hampered (i.e. the differential obtains an infinitely variable "limited slip"-function).

What is claimed is:

1. An apparatus for the distribution of the traction forces between the road wheels on each side of a motor vehicle, comprising a differential gear comprising three shafts consisting of one input shaft and two output shafts and a self energizing locking device arranged between two of the three shafts of said differential gear, the function of said locking device, being controllable by means of a control signal between four distinct working modes, being describable as:

a. said locking device is not prevented from functioning during differentiation in any of the two differentiation directions so that any differentiation will be automatically locked regardless of differentiation direction;
b. said locking device is prevented from functioning during differentiation in a first differentiation direction so that any differentiation in said first direction will not be locked;
c. said locking device is prevented from functioning in a differentiation direction opposite to said first direction so that any differentiation in said opposite direction will not be locked;
d. said locking device is prevented from functioning during differentiation in any of the two differentiation directions so that no differentiation will be locked regardless of differentiation direction.

2. An apparatus according to claim 1, wherein said locking device is arranged between the input shaft of said differential gear and one of its two output shafts.

3. An apparatus according to claim 1, wherein said locking device is arranged between the two output shafts of said differential gear.

4. An apparatus for the distribution of the traction forces between the road wheels on each side of a motor vehicle, comprising a differential gear having one input shaft and two output shafts and two self energizing locking devices each arranged between the input shaft of said differential gear and its two output shafts respectively, the function of said locking devices, is, by means of a control signal for each locking device, controllable in a way that said apparatus has four distinct working modes, describable as:
a. said locking device is not prevented from functioning during differentiation in any of the two differentiation directions so that any differentiation will be automatically locked regardless of differentiation direction;
b. said locking device is prevented from functioning during differentiation in a first differentiation direction so that any differentiation in said first direction will not be locked;
c. said locking device is prevented from functioning in a differentiation direction opposite to said first direction so that any differentiation in said opposite direction will not be locked;
d. said locking device is prevented from functioning during differentiation in any of the two differentiation directions so that no differentiation will be locked regardless of differentiation direction.

5. An apparatus according to claim 1 or 4, wherein said self energizing locking device/s consists of an internal cam profile, an external cylindrical roller race concentrically arranged in relation to said cam profile having a pitch circle, a number of cylindrical rollers placed between said two concentric parts, a roller cage arranged to keep said rollers on a pitch circle corresponding to the pitch circle of said cam profile, said roller cage is resiliently kept in frictional contact with said roller race, the resultant friction force during differentiation making said self energizing locking device lock on its own accord, a controllable signal with some part rotationally, in relation to the rotation axle, fixed in relation to said cam profile, said controllable signal is arranged in a way that it can, separately for each of the two differentiation directions, either allow or not allow said roller cage to make a, in relation to said cam profile, rotating movement.

6. An apparatus according to claims 1 or 4, wherein said self energizing locking device/s consists of an internal cylindrical roller race, an external cylindrical roller race concentrically arranged in relation to said internal roller race, a number of locking elements placed between said cylindrical roller races, a retainer fixedly attached to one of said two cylindrical roller races arranged to keep said locking elements on a specified pitch circle, a control retainer movably arranged in relation to said roller races, said movable control retainer being arranged to keep said locking elements on a pitch circle corresponding to the specified pitch circle of the fixedly attached retainer, said movable control retainer being resiliently kept in frictional contact with the other of said two cylindrical roller races, a frictional force resulting from said frictional contact during differentiation making said self energizing locking device lock on its own accord, a controllable signal with some part rotationally, in relation to the rotation axle, fixed in relation to said fixedly attached retainer, said controllable signal is arranged in a way that it can, separately for each of the two differentiation directions, either allow or not allow said movable control retainer to make a, in relation to said fixedly attached retainer, rotating movement.

7. An apparatus according to claim 1 or 4, wherein said self energizing locking device/s consists of an: external cam profile, an internal cylindrical roller race concentrically arranged in relation to said external cam profile, a number of cylindrical rollers placed between said cam profile and said roller race, a roller cage arranged to keep said rollers on a pitch circle corresponding to the pitch circle of said cam profile, said roller cage is resiliently kept in frictional contact with said roller race, a frictional force resulting from said frictional contact during differentiation making said self energizing locking device lock on its own accord, a controllable signal with some part rotationally, in relation to the rotation axle, fixed in relation to said cam profile, said controllable signal is arranged in a way that it can, separately for each of the two differentiation directions, either allow or not allow said roller cage to make a, in relation to said cam profile, rotating movement.

8. An apparatus according to claim 1 or 4 complemented by a torque redistributing device by the means of which, torque can be redistributed from either of said two output shafts to the other of said two output shafts, in a way that their respective rotational speeds actively can be forced to differentiate, wherein said locking devices can be utilized to limit the possible strain on said torque redistributing device without thereby limiting achievable torque difference.

* * * * *